United States Patent
Zhang

(10) Patent No.: US 10,292,125 B2
(45) Date of Patent: May 14, 2019

(54) METHOD AND APPARATUS FOR INTEROPERABILITY

(71) Applicant: Hang Zhang, Nepean (CA)

(72) Inventor: Hang Zhang, Nepean (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 40 days.

(21) Appl. No.: 15/217,497

(22) Filed: Jul. 22, 2016

(65) Prior Publication Data
US 2017/0064666 A1 Mar. 2, 2017

Related U.S. Application Data

(60) Provisional application No. 62/213,452, filed on Sep. 2, 2015.

(51) Int. Cl.
| | | |
|---|---|---|
| *H04W 24/00* | (2009.01) | |
| *H04W 64/00* | (2009.01) | |
| *H04W 8/12* | (2009.01) | |
| *H04W 24/02* | (2009.01) | |

(52) U.S. Cl.
CPC ............ *H04W 64/00* (2013.01); *H04W 8/12* (2013.01); *H04W 24/02* (2013.01)

(58) Field of Classification Search
CPC ....... H04W 64/00; H04W 4/02; H04W 88/06; H04W 48/18
USPC ................. 455/456.1, 456.2, 456.3, 552.1
See application file for complete search history.

(56) References Cited

U.S. PATENT DOCUMENTS

| | | | |
|---|---|---|---|
| 2008/0076386 A1 | 3/2008 | Khetawat et al. | |
| 2008/0076420 A1 | 3/2008 | Khetawat et al. | |
| 2013/0035066 A1* | 2/2013 | Nylander ................ | H04W 4/00 455/411 |
| 2013/0225123 A1* | 8/2013 | Adjakple ................ | H04W 4/24 455/406 |
| 2014/0221002 A1 | 8/2014 | Kahn et al. | |

(Continued)

FOREIGN PATENT DOCUMENTS

CN 102256219 A 11/2011

OTHER PUBLICATIONS

International Search Report for International Patent Application No. PCT/CN2016/095860 dated Nov. 9, 2016.

(Continued)

*Primary Examiner* — Temica M Beamer

(57) ABSTRACT

Methods of location tracking and location resolution are discussed for network architectures which allow devices, such as User Equipment, to communicate with different networks (e.g., different network operators) without roaming. A hierarchical Connectivity Management (CM) is provided which allows for location tracking and location resolution as devices move within and between different network boundaries. Such a hierarchy includes a Global CM which provides inter network CM, and domain CM which provides intra network CM. Some embodiments utilize virtual user CMs within the domain. In some embodiments the global CM is implemented by a third party. In other embodiments different networks inter operate by utilizing virtual network slices over non-owned infrastructure to provide what appears to be a global network by each operator.

20 Claims, 16 Drawing Sheets

(56) References Cited

U.S. PATENT DOCUMENTS

2015/0072705 A1 3/2015 Zhang
2017/0339543 A1* 11/2017 Edge ................. H04W 4/90

OTHER PUBLICATIONS

Eklund et al., IEEE Standard 802.16: A Technical Overview of the WirelessMAN™ Air Interface for Broadband Wireless Access, IEEE Communications Magazine, pp. 98-107, Jun. 2002.
Extended European Search Report dated Apr. 23, 2018 for corresponding European Patent Application No. 16840741.9 filed Aug. 18, 2016.
Zhang et al., "5G Wireless Network: MyNET and SONAC", IEEE Service Centre, vol. 29(4), Jul. 1, 2015.

* cited by examiner

METHOD AND APPARATUS FOR INTEROPERABILITY

CROSS-REFERENCE TO RELATED APPLICATIONS

The contents of U.S. Provisional Patent Application No. 62/213,452 filed on Sep. 2, 2015 are incorporated herein by reference.

FIELD OF THE INVENTION

The present invention pertains to the field of wireless network communications, and in particular to a method and apparatus for location tracking and location resolution of user equipment.

BACKGROUND

Wireless network architectures include a number of network components, such as access points or base stations, for communicating with user equipment (UE). In an aspect, UEs include mobile devices that can traverse through different geographical transmission regions (e.g. "coverage areas"), in many cases each transmission region covered by different wireless networks. These different transmission regions may be managed and operated by different wireless network service providers. As a UE moves from one region operated by one network provider, to another region operated by another network provider, a roaming scheme is typically involved to help ensure seamless connectivity to the wireless network. The roaming scheme may involve the transfer of data from one wireless network provider to another, including in some cases the transfer of some location information and mobility management data.

In an aspect, a UE may comprise a stationary device, or a device that is limited to operate in a more constrained geographic region. Even though a UE operates within a single transmission region, it may be desirable for it to gain connectivity through different wireless networks, in some cases operated by different wireless providers. In some cases, the different wireless networks may comprise different transmission modalities, for instance to gain connectivity in a tunnel or indoors. In these cases, a roaming scheme may be used to allow different wireless networks to provide connectivity. As is the case for roaming between different geographic regions, roaming between networks within a single geographic region may limit the availability of location information and mobility management data.

Accordingly, there is a need for efficient interoperation between different networks including networks offered by different service providers.

This background information is provided to reveal information believed by the applicant to be of possible relevance to the present invention. No admission is necessarily intended, nor should be construed, that any of the preceding information constitutes prior art against the present invention.

SUMMARY

The present application presents a number of solutions for a network to provide connectivity to a UE. In particular, the present application presents solutions to allow location tracking of the UE including as it crosses logical or physical boundaries within the network. In some implementations solutions are presented to allow location tracking for a UE subscribed to one network, but connecting through a second network. These solutions allow for the efficient management of UE and to extend connectivity management beyond a home network to which the UE is subscribed.

In an aspect, an object of some embodiments of the present invention is to provide an improved system and method for providing connectivity to devices which may subscribe to different network providers. Methods of location tracking and location resolution are discussed for network architectures which allow devices to communicate with different networks (e.g., networks operated by different network operators) without roaming. A hierarchical Connectivity Management (CM) is provided which allows for location tracking and location resolution as devices move within and between different network boundaries. Such a hierarchy includes a Global CM which provides inter network CM, and domain CM which provides intra network CM. Some embodiments utilize virtual user CMs within the domain. In some embodiments the global CM is implemented by a third party. In other embodiments different networks inter-operate by utilizing virtual network slices over non-owned infrastructure to provide what appears to be a global network provided by each operator.

In accordance with an aspect of the disclosure, there is provided a CM method. The CM method includes tracking the location of a wireless device at a first level of a hierarchical CM structure. The CM method further includes notifying a second level of said hierarchical CM structure of the tracked device location, which can be used during a location resolution procedure to locate said wireless device when needed. In some embodiments the hierarchical structure includes a global CM entity at a top layer of the hierarchical CM structure for providing inter domain CM. In an aspect, the hierarchical CM structure may further include at least one domain CM entity for each domain for providing intra-domain CM. This allows for inter-operator collaboration for location tracking and location resolution of a device between network boundaries spanned by the hierarchical CM structure.

In some embodiments a first network operator establishes a virtual network slice across the infrastructure of a second operator to provide service to devices which use the physical infrastructure of the second operator and use the hierarchical CM structure for providing location tracking and location resolution of devices.

Another aspect of the disclosure provides a method of interoperability between a first service provider network and a second service provider network. Such a method includes receiving a request from a first device in the first service provider network to send a message to a second device in a second service provider network. The method includes the first service provider network processing the request by attempting to determine location information about the second device using a first service provider network CM entity. Responsive to a first service provider network CM entity failing to locate a second device, the first service provider network CM entity sends a request to a global CM entity for location information, which is obtained from a second service provider network CM entity. Once received, the network can then route the message to device B through the first service provider network and the second service provider network using the received location information.

In an implementation a method is provided for location tracking of user equipment (UE). The method may include: obtaining, by a domain connectivity management (CM) component, location information of the UE; and allocating, by the domain CM component, a first virtualized connectivity management (CM) component for connecting the UE based on the location information.

In an aspect the method may further include, if the location information indicates the UE is moving from a first Tracking Area (TA) to a second TA in a first coverage of an anchor point (CAP); and forwarding, by the CM component, a current location request to SDRA-TE. In an aspect, the method may further include updating, by the CM component (e.g. V-u-CM or domain CM), a CM database with the second TA.

In an aspect the method may further include, if the location information indicates the UE is moving from a first TA of a first CAP to a second TA of a second CAP: allocating, by a domain SONAC component, a second virtualized CM component for connecting the UE in the second TA of the second CAP. In an aspect, the method may further include updating, by the domain CM component, a CM database with the second TA of the second CAP.

In an aspect, the method may further include, if the location information indicates the UE moving from a CAP of a first network domain to a second CAP of a second network domain, sending, by a CM component, the location information to a domain CM component; and, allocating, by the domain CM, a second domain CM component to manage the connecting between a virtualized CM component in the second domain CM component and the UE.

In an aspect, the method may further include, after the first virtualized CM component has been allocated, forwarding to at least one access network node an uplink measurement monitor request including at least one uplink sequence to be monitored.

In an implementation, a method is provided for providing interoperability between a first service provider network and a second service provider network. The method may include a first domain CM component serving a first domain of the first service provider network receiving, from a first UE in the first domain a request to send a message to a second UE; said first domain CM component processing said request by attempting to determine location information about said second UE from CM components within said first domain; responsive to failing to locate the second UE, said first domain CM component sending, to a global CM entity, a request for location information; said first domain CM component receiving from said global entity said location information identifying said second UE within another domain of a one of said plurality of service provider networks; and, said first UE forwarding the message to the second UE through the first service provider network and the second service provider network using the location information. In an aspect the location information may be provided by the global CM entity from an information location datastore maintained by the global CM entity and updated by regular updates received from domain CM components corresponding to each of the plurality of service provider networks.

In an implementation a method is provided for tracking a location of a UE across a plurality of communication networks. In an aspect, the method may include a connectivity manager (CM) receiving location reports related to the UE, and forwarding the location reports to a domain CM. In an aspect, the method may include a domain CM forwarding the location reports to a global CM in communication with the plurality of communication networks. The method may include the steps of the global CM receiving from a domain CM the location reports relating to the UE and maintaining the location reports in a datastore; and, when the global CM receives a location resolution request corresponding to the UE from a requesting domain CM, the global CM returns a service response including the domain ID of the UE and the destination ID of the UE to the requesting domain CM. In an aspect, wherein the location information indicates the UE moving from a CAP of a first network to a second CAP of a second network, the method may further include: receiving, by the global CM, location information from the domain CM; and communicating, by the global CM, with a global service-oriented virtual network auto-creation (SONAC) to request a second network to connect the UE.

In an implementation a computing device including at least one processing unit and operative as a domain CM component is provided. The computing device may be operative to 16. A computing device comprising at least one processing unit operative as a domain CM component to: receive from a first UE in a first domain a request to send a message to a second UE; process said request by attempting to determine location information about said second UE from CM components within said first domain; responsive to failing to locate the second UE, to send, to a global CM entity, a request for location information; receive from said global entity said location information identifying said second UE within another domain of a one of a plurality of service provider networks; and, forward the message to the second UE through the plurality of service provider networks using the location information.

In an implementation a method is provided for managing a UE subscribed to a network A, for connection to a network B on a network slice A of network A that extends onto network B (i.e. slice A@B). In some aspects the network B may be physically remote from network A, and the UE is only able to gain connectivity through network B. In the aspect, the slice A@B extends the functionality of slice A onto the infrastructure of network B to provide connectivity to the UE. In other aspects, networks A and B may service overlapping geographic regions, but for efficiency reasons it makes more sense to handle the request to access slice A on network B. Similarly, the UE is able to access services on network A, i.e. slice A, through the infrastructure of network B as the slice A is extended onto network B (slice A@B).

The method may include a connectivity management component of the network B: receiving a location registration request from the UE, requesting an update to a location of the UE; identifying that the requesting UE is subscribed to the network A and is seeking access to slice A from the network B (i.e. to use the slice A@B); forwarding the location registration request to a domain CM—A@B of the slice A@B for further communication of the location registration request to a Global CM of network A (Global CM-A); receiving a registration response confirming that the location has been updated; and, attaching the UE to the slice A@B.

In an aspect the method may further include the connectivity management component of the network B: tracking movement of the UE while attached to slice A@B to obtain UE location information; and, updating a SONAC with the location information.

In an aspect the SONAC is one of: a SONAC of network B; a SONAC of slice A@B, and/or a global SONAC.

Other aspects provide for processing systems which include a processor and machine readable memory storing software instructions which when executed cause said processor to carry out the methods disclosed herein, including instantiating and migrating the virtual entities which implement said methods.

BRIEF DESCRIPTION OF THE FIGURES

Further features and advantages of the present invention will become apparent from the following detailed description, taken in combination with the appended drawings, in which.

DETAILED DESCRIPTION

Figure 1:
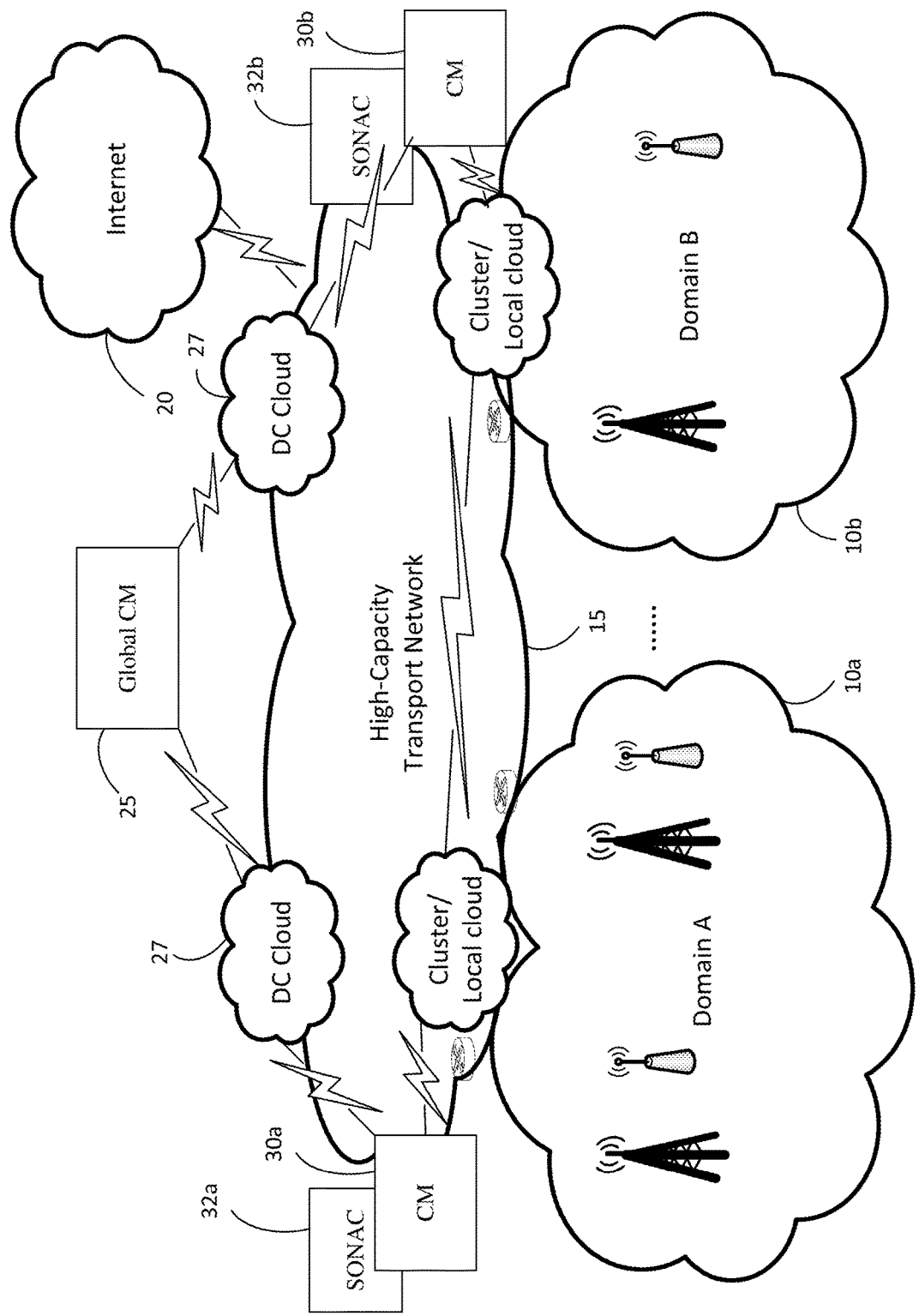
FIG. 1 illustrates an embodiment of a wireless communications network (WCN) which includes a hierarchical CM structure.

Various acronyms as used herein are defined in the following non-exhaustive list:
AP: Access Point
CAP: Coverage of an Anchor Point
DB: Domain Boundary
DL: Downlink
GW: Gateway
HO: HandOff
NN: Network Node
QoE: Quality of Experience
QoS: Quality of Service
SDRA-TE: Software Defined Radio Resource Allocation—Traffic Engineering
SONAC: Service-Oriented Virtual Network Auto-Creation
TA: Tracking Area (i.e. a list of NNs defines the TA)
UE: User Equipment
UL: Uplink
VN: Virtual Network
v-s-SGW: virtual service-specific Serving Gateway
v-u-CM: virtual user-specific Connectivity Management
v-u-SGW: virtual user-specific Serving Gateway
WCN: Wireless Communications Network Advancements in wireless network technologies and infrastructures have focused on the improvement of mobility and location management to provide efficient delivery of communication services to mobile equipment users as they travel throughout different geographical transmission regions. These schemes involve the proactive determination of the location of user equipment before a service can be delivered or transferred between different wireless network providers. Efficient mechanisms are desired to help ensure seamless connectivity and uninterrupted service delivery.

Mobility management enables a wireless network provider to locate a user equipment (UE) and determine a serving access point (AP) for delivering data packets, and to maintain its connection to the network as the UE moves, which can cause a hand-off (HO) to another AP.

Location management enables wireless network providers to track the location of user equipment, and comprises two main aspects: (i) location registration, and (ii) call delivery or paging. Conventional systems utilize a home database which is updated with a UE's last known location. During location registration, the UE periodically transmits signals to the wireless network provider, which in turn updates this database. Call delivery typically occurs after location registration, and involves querying the wireless network provider to retrieve the UE location for delivering calls or data packets. A location management scheme needs to address the following issues: (i) minimizing signaling overhead and latency in the delivery service, (ii) meeting quality of service (QoS) standards for applications, and (iii) efficient and robust service provider selection, particularly in geographical areas where overlapping wireless network providers co-exist.

Hand-off (HO) management is the process by which a UE maintains its connection when it moves between access points (e.g. nodes or base stations).

It would be useful if there was a mechanism available to allow for better co-operation between service providers to provide efficient interoperation and a seemingly transparent integration of networks. However, there is a need to identify, authenticate and locate UEs which travel in order to provide a transparent experience for users who travel, and to provide more optimized data forwarding across the networks. Similarly, there is a need to identify, authenticate and locate UEs which may need to gain access to a plurality of different networks within a geographic region. Current location management techniques are not equipped to pass detailed location information across network boundaries, as current location management is limited to intra-domain tracking. Extending location management across different network boundaries may allow for more efficient coverage, to manage data traffic loads, and/or to provide for virtual wireless connectivity across third party infrastructure.

Before a UE can connect to and communicate with a wireless network, its credentials need to be determined to identify the UE and determine what services it is authorized to access. The credentials define an identity structure which can include, for instance, a customer name (of an individual, organization, etc), a device name, device credentials, and/or user credentials. An example of device credentials includes the SIM cards used in 3G/4G networks. More information about credential management is discussed in application U.S. Ser. No. 62/020,593, Wireless network access protection and security architecture, filed Jul. 3, 2014, which is hereby incorporated by reference in its entirety.

An aspect of future networks can include breaking the binding in such an identity structure by decoupling the device ID, Credential (SIM), device name and physical networks. Embodiments will include three separations in terms of equipment, network operation and service provisioning; namely the decoupling between:
hardware and software
data plane and control plane
device ID/credential and physical network operators
Benefits of such decoupling can include:
Avoiding home network-visiting network roaming
Avoiding the need for a credential change
Efficient location resolution
Transparent inter-network roaming. Indeed, in some embodiments UEs are located and served by APs without being considered to be roaming.

Referring to FIG. 1, there is shown an embodiment of a wireless communications network (WCN) which includes a hierarchical Connectivity Management (CM) structure with various CM instances deployed on different components of the WCN. The CM, at least in so far is it relates to location tracking, may also be referred to as "Mobility Management" (MM) by persons of skill in the art. In the present application the term CM is used as the component may include functionality beyond location tracking or mobility management.

The WCN includes two network operator domains (Domain A and Domain B) 10a, 10b, linked b y a high capacity transport network 15 which connects to the internet 20. The example CM hierarchy illustrated in FIG. 1 includes a global CM instance 25. In this example, the global CM instance 25 is shown as being deployed in a Data Center (DC) Cloud(s) 27 though it may in practice be deployed in other locations as convenient. In some embodiments the global CM instance 25 may be administered by a third party trusted by each domain operator. Below the global CM are domain CM instances 30a, 30b for each domain 10a, 10b. Each domain CM instance can be deployed in conjunction with a Service Oriented Network Auto Creation (SONAC) instance 32a, 32b, if needed. As will be discussed below, there are potentially multiple layers of CM (e.g. global/domain/local/etc.) for example global, domain, local, and potentially other layers of CM). Typically, the layers include global CM 25 above domain CM 30a, 30b above local (or per user) CM (not illustrated in FIG. 1 which illustrates the network side). However, the layer below global can be either a domain CM 30a, 30b or a local CM depending on the hierarchy, which is configurable. Each domain can be implemented by a separate operator (which will be considered to be a separate network with its own network ID). Large network operators can subdivide their networks into separate domains for network management reasons (with each domain having its own domain ID).

As used herein, "SONAC" refers to a Service Oriented Network Auto Creation technology, which carries out the functions of a software controller. In various embodiments, SONAC includes three enabling technologies, namely Software Defined Topology (SDT), Software Defined Resource Allocation (SDRA), and Software Defined Protocol (SDP). In a given SONAC, some or all of SDT, SDRA and SDP may be used. Which of these technologies are included in a given SONAC can be controllable. The SONAC may also include a "Session Management" (SM) function as understood by persons of skill in the art.

The present disclosure discusses two different schemes. A first scheme utilizes a $3^{rd}$ party operated global CM, such as an independent corporation that manages the global CM to provide interoperability between the networks of different network operators. A second scheme would allow a network operator to divide its network into multiple domains, each having its own domain CM. A global CM could be maintained by the network operator, or a $3^{rd}$ party, to provide inter-domain CM, as well as CM outside of the network operator's network. In some aspects the network operator may maintain a network CM for providing inter-domain CM, and a separate global CM (maintained by the network operator or a third party) may provide inter-network CM outside of the network operator's network. A third scheme allows a single operator to utilize virtual networks (VNs) to provide global coverage. For each scheme the following is discussed:
i. Location tracking
ii. Location resolution
iii. Optimal data forwarding
iv. Unified data/voice solution Scheme 1

Location tracking involves tracking the location of the device in relation to the topology of the network. Conventionally, it has related to determining which tracking area the UE is in, or to which network node (NN) the UE is connected. The CM function discussed herein provides greater detail in the location tracking of a device. Future networks will likely include a variety of different access technologies, including current standardized RAN formats (e.g. LTE) as well as future RAN standardized formats and other connection technologies (e.g. WiFi).

A CM (e.g. a local CM or a domain CM 30a, 30b) can track the UE connection across multiple access point types to help the network determine the device's ability to receive from and transmit to particular NNs. Embodiments provide CM functionality to inform the SONAC of required location information to allow the SONAC to allocate the appropriate wireless resources in order to establish access links between devices and NNs. NNs will potentially be involved with both downlink (DL) transmissions to a device, and the uplink (UL) reception of signal transmissions from a UE. NNs can include any device configured for communications with one or more UE(s) within a communications system. For example, NNs may include receivers, antennas, base stations (BS), base transceiver stations (BTS), Node-B, evolved Node-B (eNodeB), a home Node-B, a home eNodeB, site controllers, access points (AP), and C-RAN clusters which include Remote Radio Heads (RRHs) controlled by a suitable controller.

Figure 2:
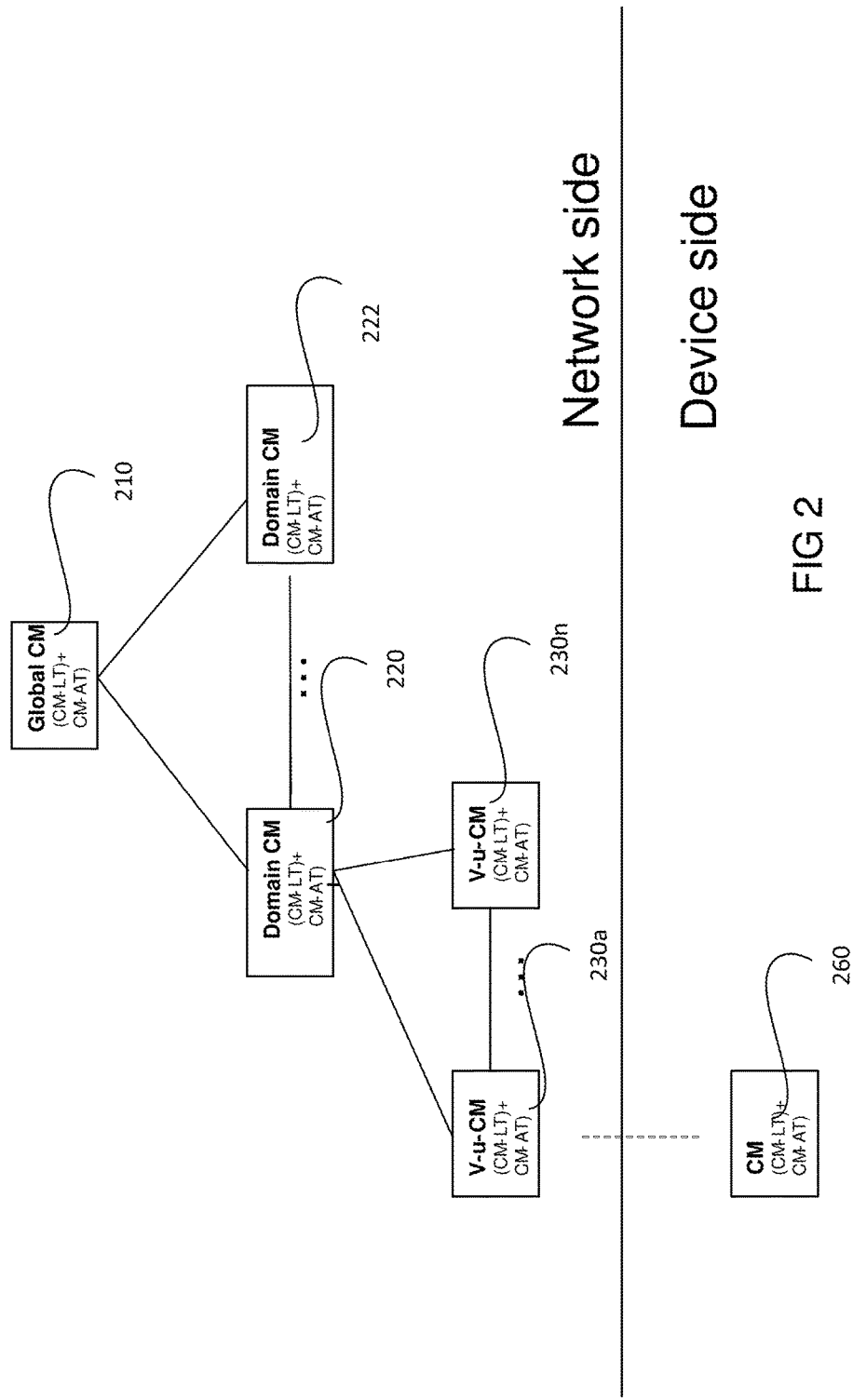
FIG. 2 illustrates an embodiment which can include many instances of CMs, each providing different aspects of connectivity management.

Referring to FIG. 2, connectivity management is provided through the use of the connectivity manager (CM). As shown in FIG. 2, embodiments can include many instances of CMs, each providing different aspects of connectivity management. A global CM 210 can manage the connectivity management of a network, through interactions with domain specific CMs 220 and 222. Virtualized instances of a CM and be made to be user specific, as shown with V-u-CM 230a which, in some embodiments can connect to a UE CM component 260 resident in a UE, for UEs so equipped. UE CM component 260 and the respective V-u-CM communicate with each other to collaboratively perform location tracking (CM-LT) and optionally activity tracking (CM-AT) of the UE. As the UE moves through the network, the V-u-CM can be migrated to different nodes to better serve the UE, as shown through the plurality of instances from 230a to 230n. For simplicity only one UE is shown, but it should be appreciated that many UEs will be supported in a typical implementation.

Virtual user-specific (V-u) CM instances such as 230a are instantiated as needed to perform edge CM functions on a per user or per UE basis. It should be appreciated each CM instance may be geographically separated and individually deployed on different components of a WCM (not shown). Although not shown, a service specific virtual CM could also be instantiated to serve the needs of MTC UEs that all interact with the same service.

Domain specific CMs and the Global CM may be virtualized entities supported by a data center, or across a number of data centers. These entities can be either discrete entities or virtualized functions resident in a cloud environment. In an aspect a CM entity may comprise program code executed on one or more processing elements, once executed carries out the functions of a CM instance. In an aspect, the CM entity may comprise program code executed across a plurality of processing elements that are physically separated. Accordingly, the CM functions may be physically separated, across separate processing elements, in order to provide the location tracking and reporting functions.

Although the use of a v-u-CM is illustrated in FIG. 2, it should be understood that a single discrete CM may handle the connectivity management functions for a plurality of different nodes. In some embodiments, for wireless devices capable of supporting enhanced functionality, connectivity management agents or "hooks" can be installed on the device to enhance CM functionality. This can allow for advanced functionality such as allowing a UE that initializes an application which typically involves transmission, to notify the V-u-CM (or other network CM instance) to allocate resources in accordance with a predicted transmission. Accordingly, a UE agent in a UE device can participate in configuring resources for expected traffic flows In some embodiments the global CM node 210, along with the Domain CM nodes 200 . . . 222 collaborate to replace and enhance the functions previously performed by an MME. Accordingly, such embodiments can be considered to provide CM functionality which expands beyond the manner in which the MME performed connection management. This expansion allows for more information to be taken into account in making resource allocation decisions, including information from the UE and the type of UE. Further, this hierarchical structure of CM components allows for location tracking and registration of mobile UEs. In order to provide a connection, for example a call, to a UE, its location must be determined. This location can be searched locally first, and if a UE is not located, the search escalates up the hierarchy to determine the location of any give UE. This allows for inter-operator collaboration for location tracking and location resolution of a UE.

Figure 3:
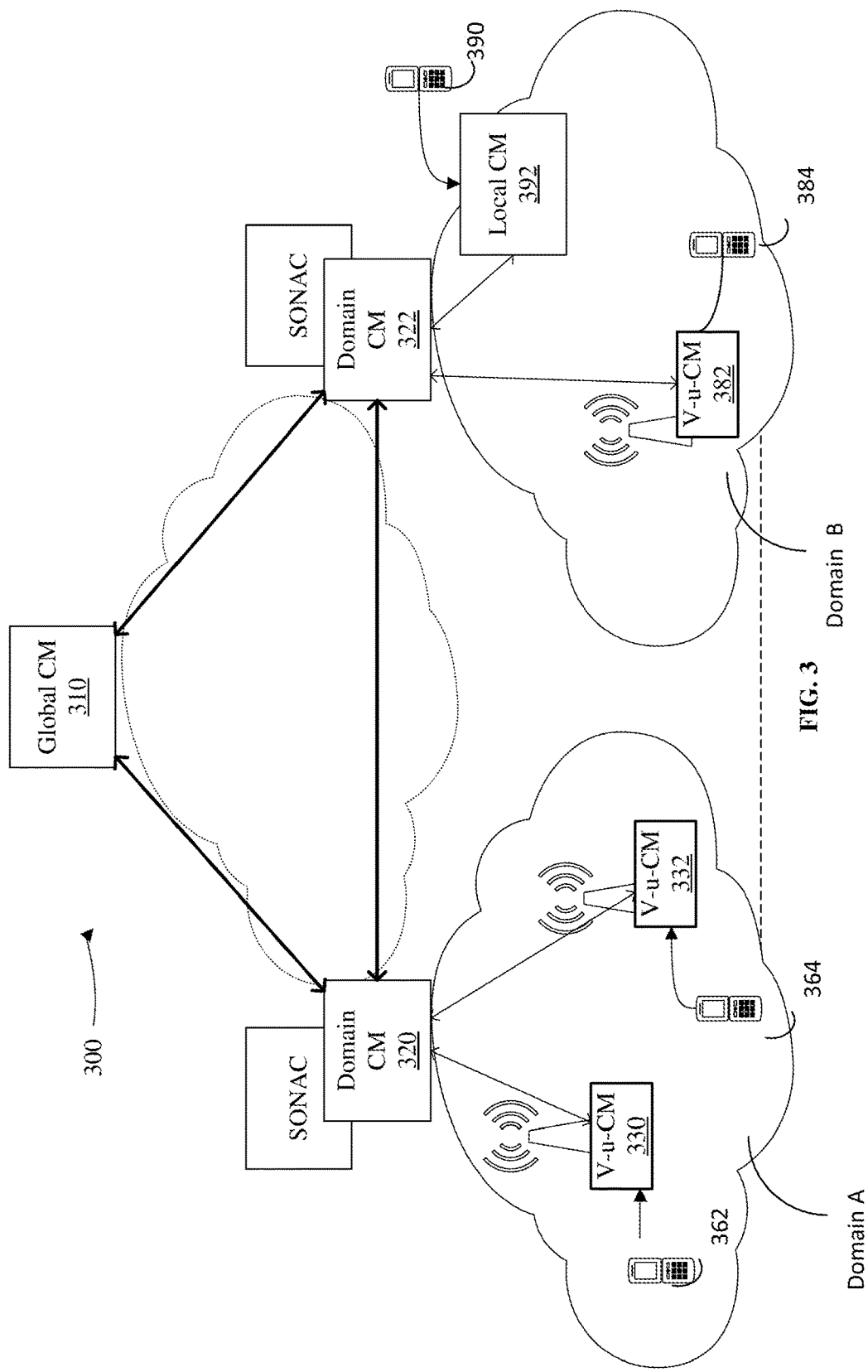
FIG. 3 illustrates an embodiment of a wireless communications network (WCN) which includes a hierarchical CM structure with various CM instances deployed on different components of the WCN.

According to some embodiments, a non-exhaustive list of functions performed by the hierarchical structure of CM components are listed below:

a) Global CM functions (some of which may be administered by a 3$^{rd}$ Party):
   i. Receive service characteristics (predictability/non-predictability) from domain CM
   ii. Receive service QoE requirement(s) from domain CM
   iii. Maintain device activity info (service ID/device ID: activity pattern) based on information provided by the domain and/or global SONAC
   iv. Maintain device location info (service ID/device ID: network (operator) ID, Domain ID, Network Address (NA) of domain Gateways (GWs))
   v. Send the QoE requirement(s), device activity info, and device location info to local CM (e.g., a V-u CM)
   vi. Receive domain Hand-Off (HO) message from serving domain CM
   vii. Inform domain HO message to target domain CM
   viii. Trigger a virtual domain CM creation when a domain boundary is crossed.

b) Per-network (operator) CM (or domain CM) functions:
   i. Process non-registered UEs
   ii. Create virtual per-UE CM
   iii. Attach UE to a slice
   iv. Migrate v-s-SGW
   v. Configure CM schemes for v-u-CM
   vi. Provide domain HO to global CM when a domain boundary is crossed
   vii. Maintain info [DeviceID: v-u-SGW NA (SID)]

c) Local/Edge CM (which may be established per user, e.g., Virtual user/device/terminal v-u-CM) functions:
   i. Perform customized CM-LT/AT/TA described
   ii. Maintain info [DeviceID: set of serving NN NA, MAC state]
   iii. Detect domain boundary crossing
   iv. Report to domain CM
   v. Detect TA boundary crossing Referring to FIG. 3, there is shown an embodiment of a wireless communications network (WCN) 300 which includes a hierarchical CM structure with various CM instances deployed on different components of the WCN 300. The example CM hierarchy illustrated in FIG. 3 includes global CM instance 310, which can be deployed in a Data Center (DC) Cloud, domain CM instance 320, 322 deployed in conjunction with a Service Oriented Network Auto Creation (SONAC) instance, and one or more CM instances in each domain. For example, edge (V-u) CM instances 330, 332 are deployed in Domain A, whereas edge (V-u) CM instances 382 and local CM instance 392 are deployed in Domain B. The global CM instance 310 is communicatively coupled to domain CM instance 320, 322 through a transport network. Within domain A UE 362 is served by edge CM instance 330, and UE 364 is served by edge CM instance 332. Similarly, within domain B, UE 390 is served by local CM instance 392 and UE 384 is served by edge CM instance 382. As described above, CM instances may function independently, or collaboratively, in carrying out respective hierarchical functions to perform location tracking (CM-LT) and optionally activity tracking (CM-AT) of respective UEs 360, 362, 364, 384 communicatively coupled to the CM network on the WCN 300.

Figure 4A:
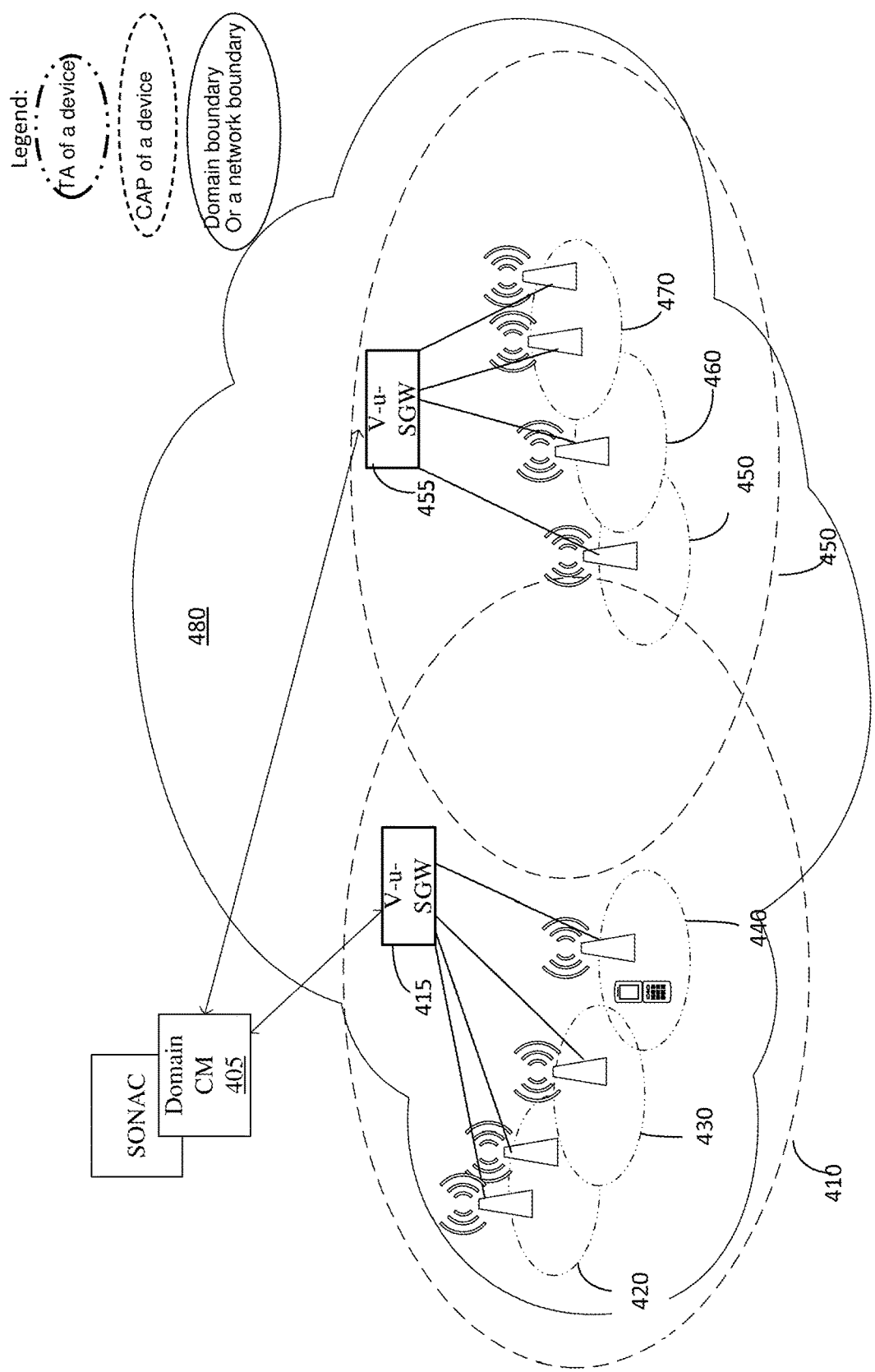
FIG. 4a illustrates a single network domain according to an embodiment.

FIG. 4a illustrates a single network domain according to an embodiment. Typically, a network domain 480 will be managed by a single network operator. A domain includes a plurality of NNs which can provide connectivity to UEs. In this embodiment, virtual user Serving Gateways (v-u-SGWs) are instantiated to provide service on a per user basis, for example v-u-SGWs 415, 445. Each represents an anchor point which can forward packets to UEs via one or more NNs. The v-u-SGWs may be instantiated at one or more processing elements of a NN, an access point, or a network domain server/data centre. In some aspects the v-u-SGWs may each be instantiated across a plurality of processing elements. For instance, v-u-SGW functionality may be instantiated proximate to a UE accessing the network domain 480 at a local or regional processing element, for instance on a server located in a local or regional data centre. The v-u-SGW functionality may be instantiated proximate to a UE accessing the network domain 480 through an access point at both at least one processing element either at or proximate to the access point and at least one processing element at a local or regional server/data centre.

Each v-u-SGW 415, 455 has a Coverage of an Anchor Point (CAP) 410, 450 respectively. Each NN is shown to have a tracking area (TA). However, there need not be a one-to-one correspondence between NNs and TAs, as some TAs can include multiple NNs. Accordingly, CAP 410 includes TAs 420, 430 and 440. Similarly CAP 450 includes TAs 450, 460, 470. Further, the domain CM 405 instantiates and moves v-u-CMs as needed (for instance, via instruction to a Virtual Network Function Manager and/or Orchestrator (not shown). However, for ease of illustration the V-u-CMs have not been illustrated in FIG. 4*a*.

Referring to FIG. 4*a*, there are three different levels of boundary indicated: i) the local Coverage of an Anchor Point (CAP); ii) the Tracking Area (TA) of a UE (i.e. the network cloud of the UE; and, iii) the domain boundary (DB) between network domains.

The following points are noted:
Coverage of an Anchor Point (CAP):
a. the anchor point could be, e.g., v-s-SGW or v-u-SGW
b. the CAP may include a set of NNs which can be reached by the anchor
c. when a UE moves out of its CAP, either
   i. the anchor point should be changed; or,
   ii. the anchor point should be migrated to cover the UE in the new location.
Tracking Area (TA) or (network cloud) of a UE is a UE-centric view of its local tracking and is typically comprised of a set, or list, of NN's that are defined to make up a specific TA:
a. a TA could be the same as the CAP, or can extend past the CAP
b. a TA could be the combination of multiple CAPs if there are multiple anchor points for a UE
c. a TA could be a sub-area within a CAP
d. a TA could be a geographic area (e.g. a city or neighborhood)
e. preferably all NNs within the TA of a UE perform location tracking and reporting operations for that UE
f. in an aspect the NNs further perform DL/UL control/data processing (e.g., data, page, monitoring of UL code)
Domain boundary (DB)
a. A list of NN IDs which are within the boundary of a domain As a UE moves, it may cross one of the boundaries described above (e.g, TA, CAP, Domain). Example location tracking procedures will now be discussed. It should be noted that additional examples of location detection are discussed in U.S. Provisional Patent application 62/186,168, System and Method for Connectivity Management for Wireless Devices, filed Jun. 29, 2015, which is hereby incorporated by reference in its entirety.

When a UE moves from one TA to another (e.g., crosses from TA 420 to TA 430), then one embodiment may implement the following location tracking procedure:

Detection of the UE by a v-u-CM or any other equivalent network entity which tracks a UE's location will occur in TA 430.
  a. In some embodiments a UE report analysis and/or a NN report analysis is made based on the CM scheme of the UE CM databases are updated with the new TA. Further, NN configuration occurs for serving (or potential serving nodes in the new TA).

CM informs SDRA-TE (e.g., packet forwarding rules are updated based on the new location of the UE such that the v-s-SGW 415 directs packets to the appropriate NNs).

Figure 4B:
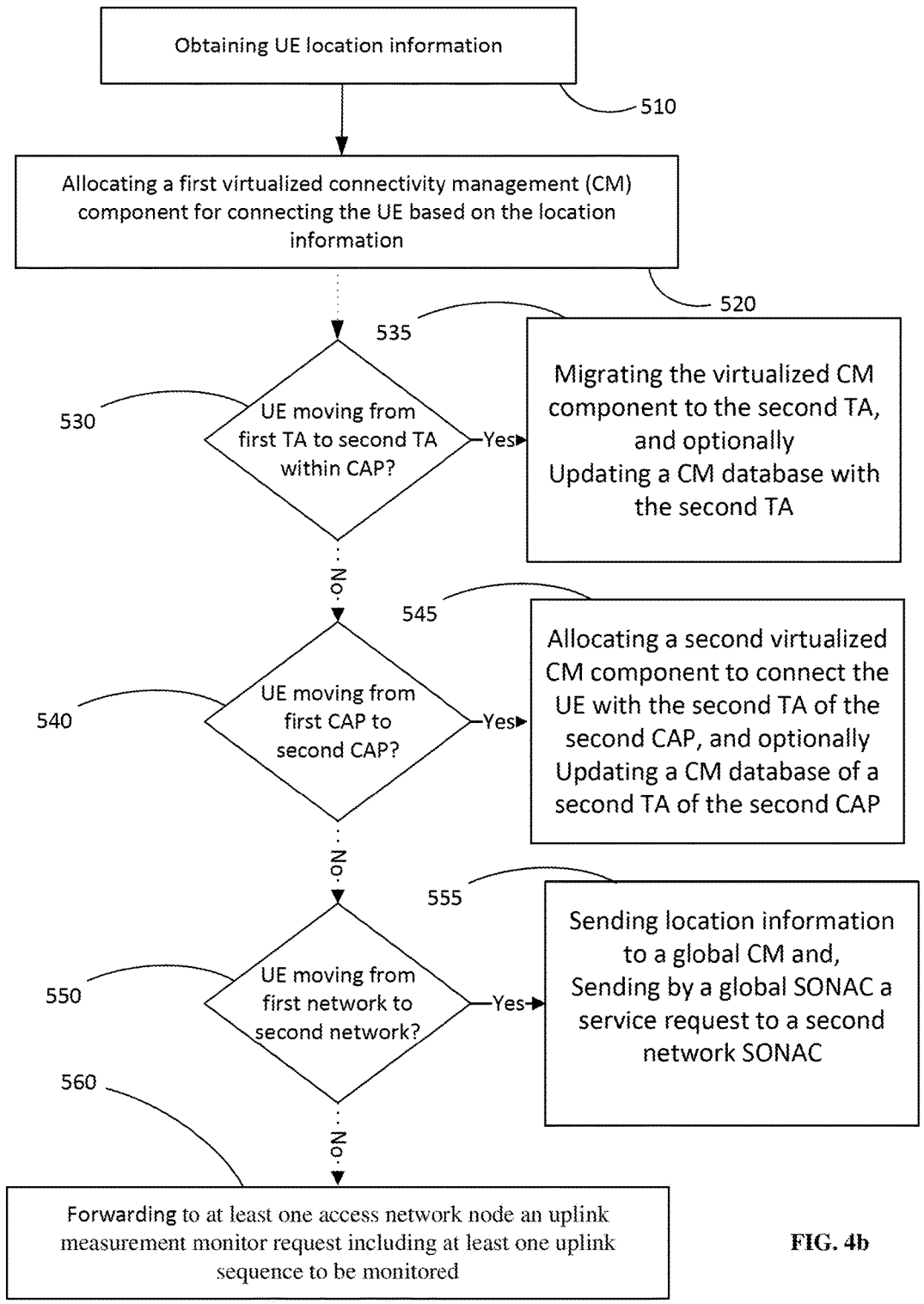
FIG. 4b illustrates an embodiment of a process flow diagram for obtaining UE location information.

Referring to FIG. 4*b*, a process flow diagram is presented illustrating an embodiment of a method for location tracking of UE carried out by a domain CM component. In step 510 the domain CM component obtains location information of the UE and, in step 520 allocates a first virtualized CM component for connecting the UE based on the obtained location information. If, in step 530, the location information indicates that the UE is moving from a first Tracking Area (TA) to a second TA in a first coverage of an anchor point (CAP), in step 535 the domain CM component migrates the first virtualized CM component to the second TA. In an aspect, the domain CM component may further update a CM database with the identity of the second TA that the UE has moved to. If, in step 540, the location information indicates that the UE is moving from a first TA of a first CAP to a second TA of a second CAP, in step 545 the domain CM component allocates a second virtualized CM component for connecting the UE in the second TA of the second CAP. In an aspect, the domain CM component may further update a CM database with the identity of the second TA of the second CAP that the UE has moved to. If, in step 550, the location information indicates that the UE is moving from a CAP of a first network to a second CAP of a second network, then in step 555 the domain CM component sends the location information to a global CM. Furthermore, in response to the global CM receiving the updated location information, a global SONAC in communication with the global CM sends a service request to a second network SONAC to manage the connection between a second virtualized CM component in the second network and the UE.

Figure 5:
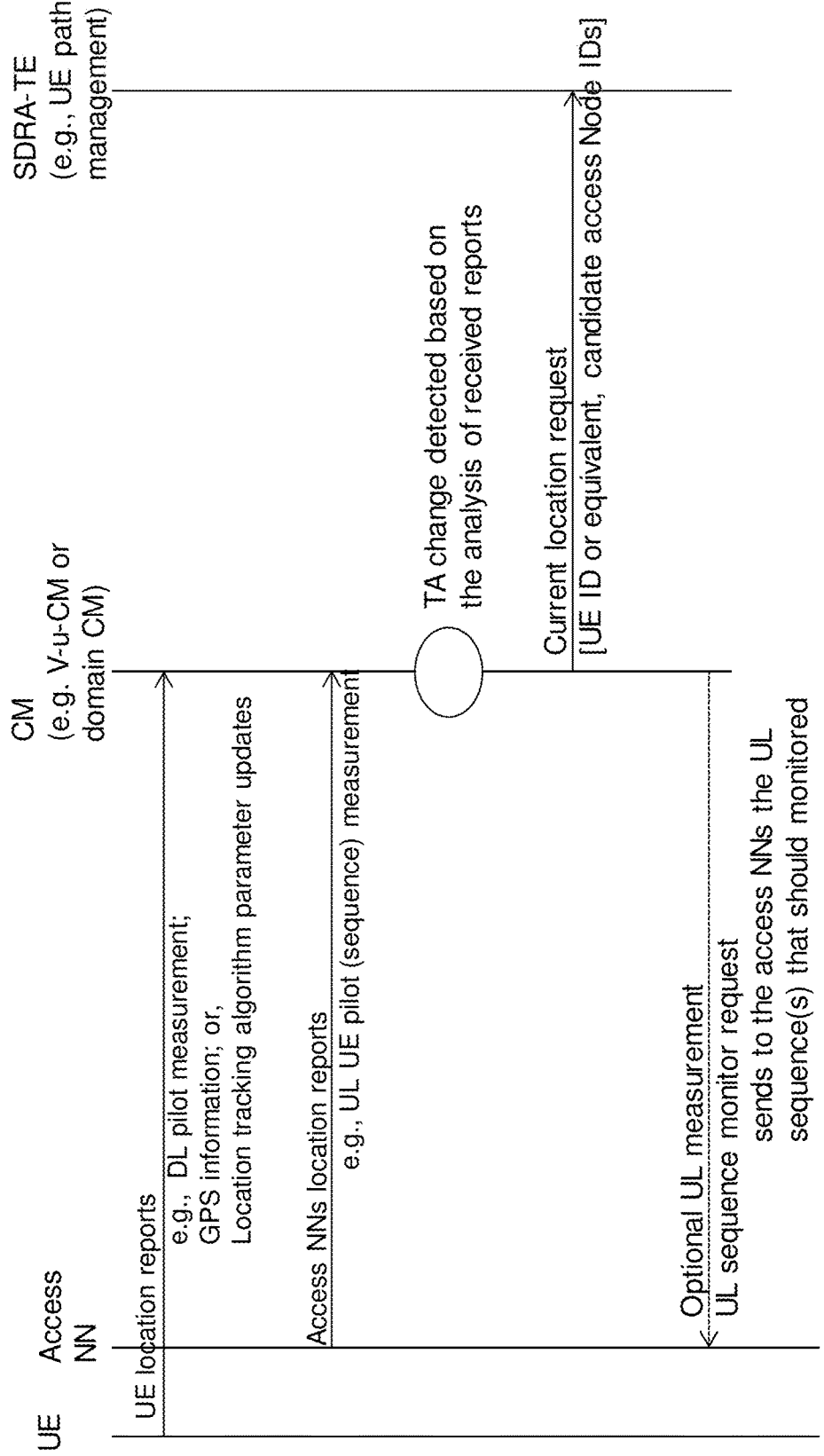
FIG. 5 illustrates a signaling diagram for an embodiment of tracking a UE as it crosses Tracking Area (TA) boundaries.

Referring to FIG. 5, a signaling diagram presents an exemplary signaling procedure for tracking a UE as it crosses TA boundaries:

The UE forwards UE location reports to the CM (e.g. V-u-CM or domain CM)
  a. The location reports may include, for instance, DL pilot measurement, GPS information, or parameter updates for a location tracking algorithm
  b. In an aspect the location reports may be forwarded to the access NN to then forward to the CM (e.g. V-u-CM or domain CM)
Access NNs serving the UE forward access NN location reports to the CM (e.g. V-u-CM or domain CM)
  a. The access NN location reports may include, for instance, the UL UE pilot (sequence) measurement
  b. In some aspects, the UE may maintain and forward the location reports to the CM
The CM receives the UE location reports and/or the access NN location reports and is operative to analyze the received reports to detect a change in the TA of the UE when it crosses a TA boundary Upon detecting that a UE has changed its TA after crossing a TA boundary, the CM forwards a current location request to the SDRA-TE
  a. The current location request may include, for instance, the UE ID corresponding to the UE that crossed the boundary, and/or candidate access node ID's for a perceived next TA of the UE
In an aspect, the CM may further instruct the access NNs to monitor UL sequence(s) to enable a UL measurement of the UEs If a UE crosses a CAP boundary (e.g., moves from CAP 410 to CAP 450), then one embodiment implements the following location tracking procedure:

Detection by v-u-CM or any other equivalent network entity which tracks UE locations that a boundary crossing will, or is likely to, occur from a first CAP 410 to a second CAP 450. For example, a v-u-CM, based on the CAP list, determines if the UE has crossed a CAP boundary.
 a. a similar procedure as TA boundary crossing occurs as the TA of the UE will likely also have changed. In addition, the following occurs:

V-u-CM sends an update to the domain CM for v-u-SGW replacement (or a SGW which is acting as anchor of a UE)

Domain CM informs the v-u-CM of the updated CAP (list of NNs within the CAP)

Domain CM informs SDRA-TE (e.g., domain SDRA-TE).

Figure 6:
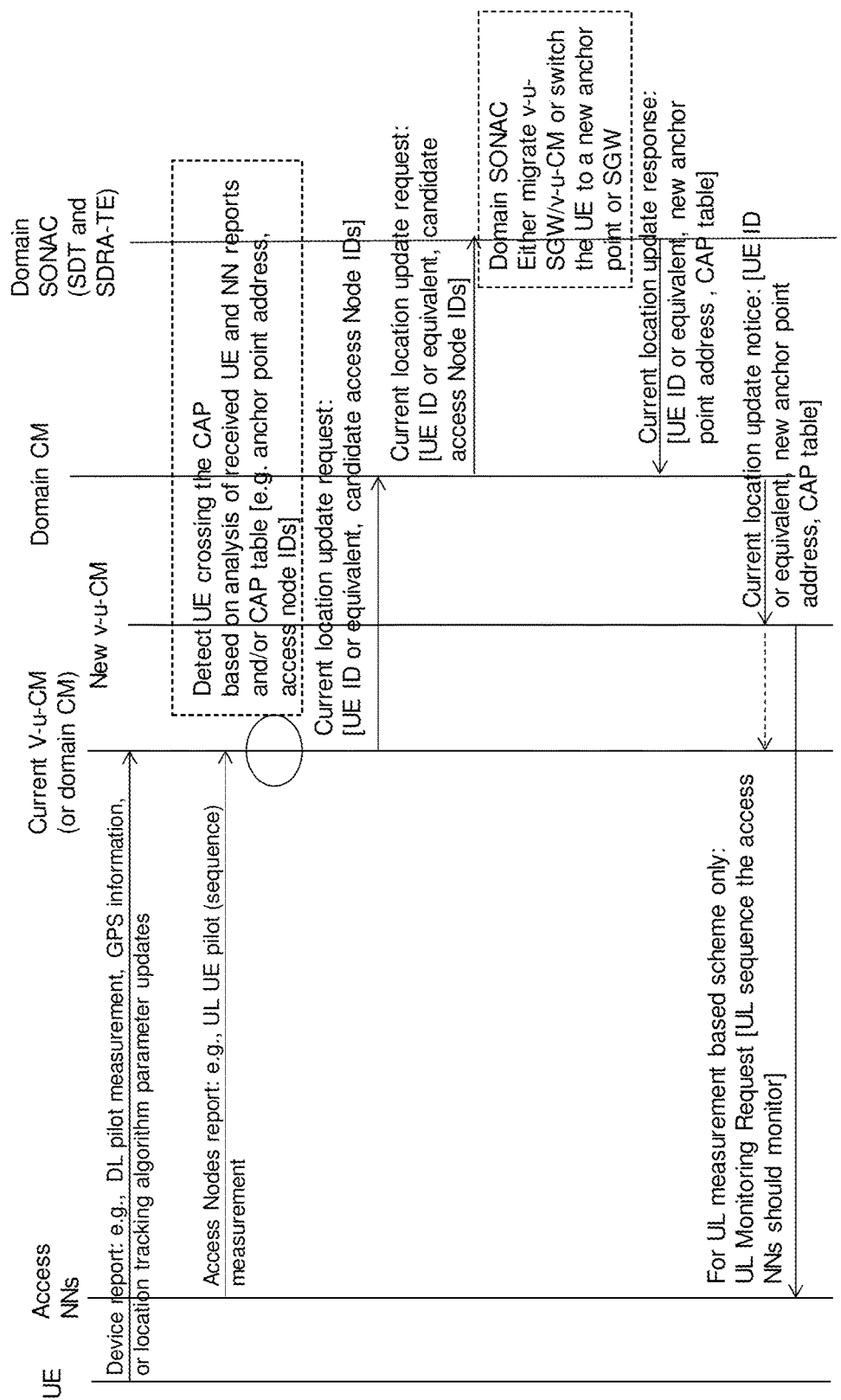
FIG. 6 illustrates a signaling diagram for an embodiment of tracking a UE as it crosses Coverage of an Anchor Point (CAP) boundaries.

Referring to FIG. 6, a signaling diagram presents an exemplary embodiment of a signaling procedure for tracking a UE as it crosses CAP boundaries:

UE forwards UE location reports to the current CM (e.g. the existing V-u-CM or domain CM in the current CAP)
 a. The location reports may include, for instance, DL pilot measurement, GPS information, or parameter updates for a location tracking algorithm
 b. In an aspect the location reports may be forwarded to the access NN to then forward to the current CM (e.g. V-u-CM or domain CM) on behalf of the UE Access NNs serving the CAP forward access NN location reports to the CM (e.g. V-u-CM or domain CM)
 a. The access NN location reports may include, for instance, the UL UE pilot (sequence) measurement The current CM receives the UE location reports and/or the access NN location reports and is operative to analyze the received reports to detect a change in the TA of the UE when it crosses a TA boundary Upon detecting that a UE has changed its CAP after crossing a CAP boundary, the CM forwards a current location request to the Domain CM for forwarding to the Domain SONAC (SDT and SDRA-TE)
 a. The current location request may include, for instance, the UE ID corresponding to the UE that crossed the boundary, and/or candidate access node ID's for a perceived next CAP/TA of the UE The Domain SONAC receives the current location request and reassigns the UE to the new CAP by either migrating v-u-SGW/v-u-CM to the new CAP, or switching the UE to a new anchor point or SGW serving the new CAP The Domain SONAC returns a current location update response to the Domain CM
 a. The current location update response may include, for instance the UE IE (or equivalent), a new anchor point address, and/or an updated CAP table The Domain CM receives the current location update response and generates a current location update notice to be distributed to the current CM (e.g. current v-u-CM or domain CM) and the new CM (e.g. new v-u-CM or domain CM)
 a. The current location update notice may include, for instance, the UE ID (or equivalent), a new anchor point address, and/or an update CAP table In an aspect, the new CM may further instruct the access NNs to monitor UL sequence(s) to enable a UL measurement of the UEs If a UE crosses a Domain boundary (e.g., moves from Domain A to Domain B), then one embodiment implements the following location tracking procedure:

UE crosses domain or network boundary

Detection by v-u-CM or any other equivalent which tracks a UE's location. For example, v-u-CM, based on domain/network boundary NN list, determines if the UE crosses a boundary of a domain/network
 a. a similar procedure as TA boundary crossing occurs as the TA of the UE will also have changed. In addition, the following occurs:

v-u-CM informs domain CM

Domain CM informs global CM

Global CM updates its database for this UE

Global CM informs this event to the target network (which is the Domain B operator in this example).

Figure 7:
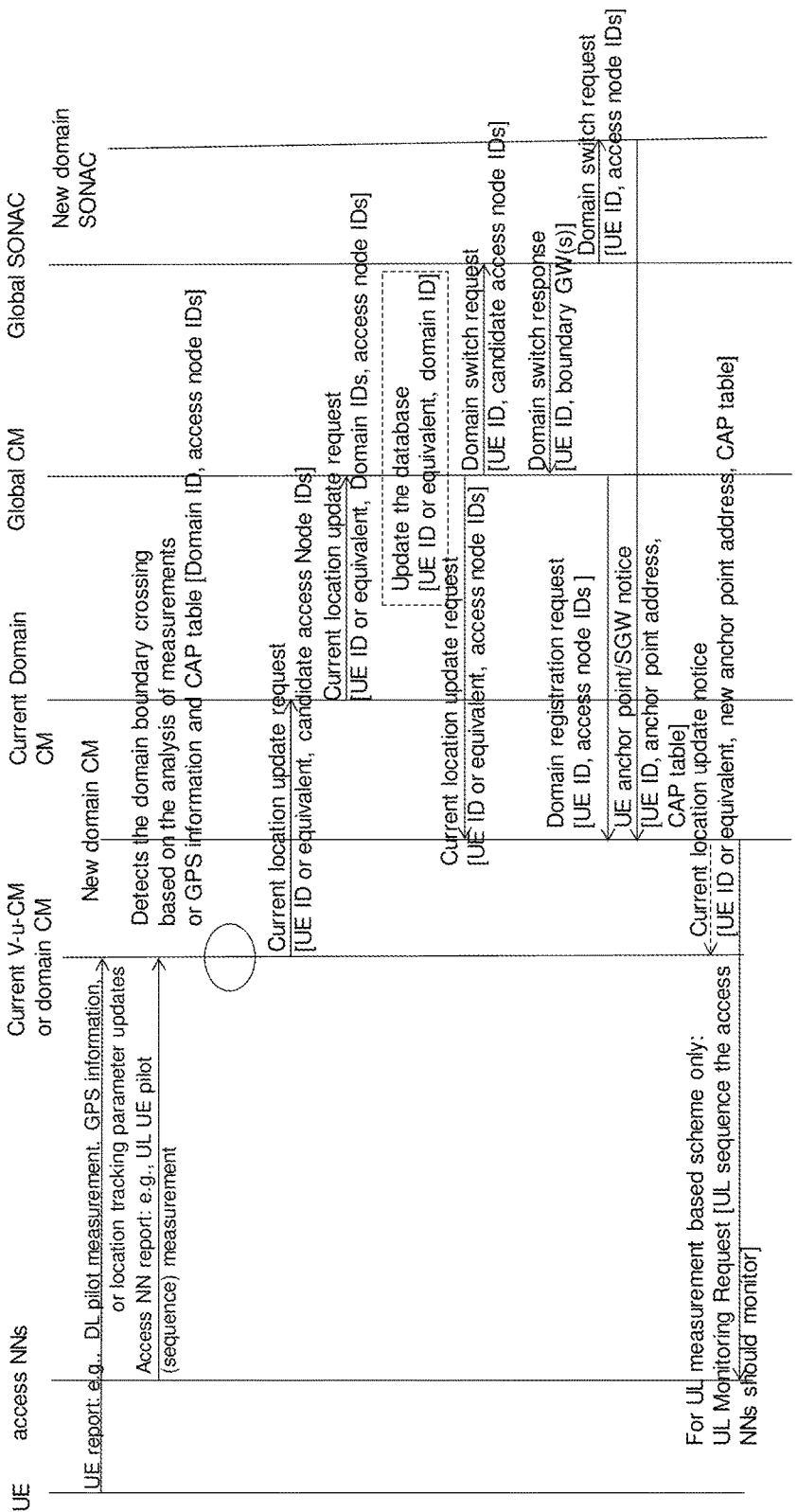
FIG. 7 illustrates a signaling diagram for an embodiment of tracking a UE as it crosses domain or network boundaries.

Referring to FIG. 7, a signaling diagram presents an exemplary signaling procedure for tracking a UE as it crosses domain or network boundaries:

UE forward UE location reports to the current CM (e.g. v-u-CM or domain CM in the current domain/network)
 a. The location reports may include, for instance, DL pilot measurement, GPS information, or parameter updates for a location tracking algorithm In an aspect the location reports may be forwarded to the access NN to then forward to the current CM (e.g. V-u-CM or domain CM)

Access NNs serving the domain forward access NN location reports to the CM (e.g. V-u-CM or domain CM)
 a. The access NN location reports may include, for instance, the UL UE pilot (sequence) measurement The current CM (e.g. v-u-CM or domain CM) receives the UE location reports and the access NN location reports and is operative to analyze the received reports to detect when the UE crosses a domain boundary Upon detecting that a UE has crossed a domain boundary, the CM forwards a current location update request to the Global CM The current location request may include, for instance, the UE ID corresponding to the UE that crossed the boundary, and/or candidate access node ID's for a perceived next CAP/TA of the UE, and optionally the domain IDs involved in the crossing)

Where the current CM is the v-u-CM, then the v-u-CM first forwards the current location update request to the current Domain CM for forwarding to the Global CM The Global CM receives the current location update request, updates the location database to reflect that the UE has left its current domain, forwards a current location update request to the new domain CM (e.g. identifying the UE ID or equivalent, and access node IDs), and forwards a domain switch request to the Global SONAC (e.g. identifying the UE ID, and candidate access node ID's)

The Global SONAC receives the domain switch request and forwards the domain switch request to the new domain SONAC, and returns a domain switch response to the Global CM (e.g. UE ID and boundary GWs)

The Global CM receives the domain switch response and forwards a domain registration request to the new domain CM (e.g. UE ID, and access node IDs)

The new domain SONAC receives the domain switch request and forwards a UE anchor point/SGW notice to the new domain CM (e.g. UE ID, anchor point address, CAP table)

The new domain CM updates the UE tracking information to assist it in monitoring future boundary crossings Optionally the new domain CM may send a current location update notice to release the current CM Optionally the new domain CM may send a UL monitoring request to access NNs served by the new domain CM As can be seen, messaging between the levels of the hierarchical structure of the CM network occurs to track the location of the UE as the UE moves. When domain A and domain B represent networks of different operators, the Global CM can in implemented by a $3^{rd}$ party, which acts an intermediary for providing the Global CM functionality between the different operators.

Figure 8:
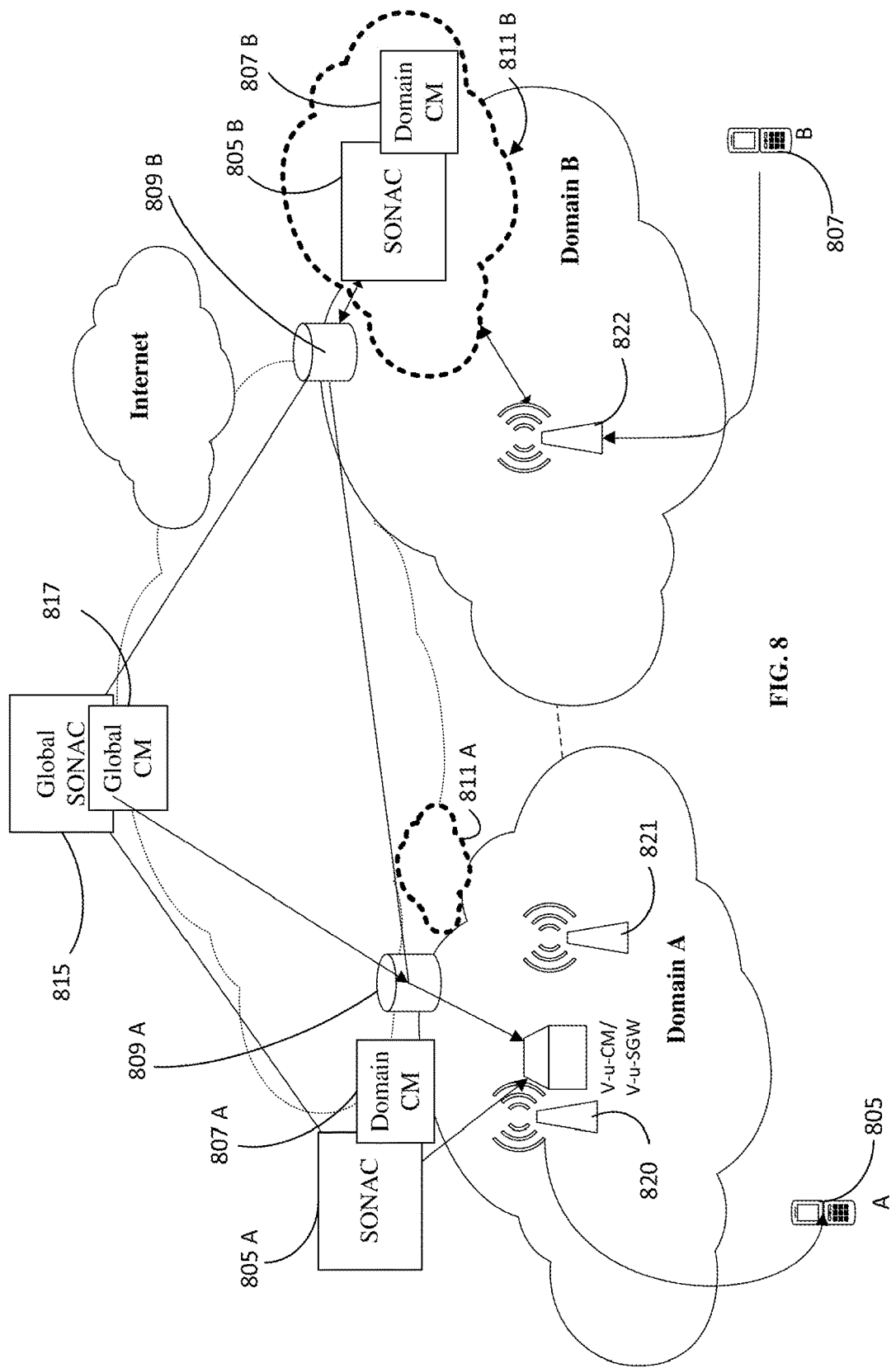
FIG. 8 illustrates a simplified network block diagram schematically illustrating a service (e.g., a call) established between device A (which is connected to Domain A) and device B (which is connected to domain B).

The tracked location is used during location resolution as part of providing a service to a UE. Examples will be discussed depending on the nature of the service, with reference to FIGS. 8 and 9. FIG. 8 is a simplified network block diagram schematically illustrating an embodiment of a service (e.g., a call) established between UE A 805 (which is connected to domain A) and UE B 807 (which is connected to domain B). FIG. 8 illustrates two exemplar implementations for practicing the methods described herein. Referring to domain A of FIG. 8, the domain A SONAC 805 A, domain A CM 807 A and associated location information database 809A for recording location information related to UE accessing domain A are located on servers or network nodes in communication with a first domain A radio head 820 and a second domain A radio head 821, serving a first TA and a second TA respectively, as well as the global SONAC 815 and Global CM 817. In some embodiments, a direct connection may also be provided between the elements of domain A, and the elements of domain B. A domain A network cloud 811 A to provide network resources is also provided in addition to the above domain A elements.

Referring to domain B of FIG. 8, the domain B SONAC 805 A and domain B CM 807 B are provided as virtualized instantiations within the domain B network cloud 811 B. In practice some, all or none of the various Domain SONACs and Domain CM may be instantiated within domain clouds or as separate elements provided by network servers/nodes. FIG. 8 illustrates both alternatives in a single figure for representative purposes. domain B further includes a location information database 809 B for recording location information related to UE accessing domain B to be made available to the domain SONAC and domain CM. The radio head 822 provides connectivity for UE, such as UE B 807, to connect to domain B.

Also illustrated in the embodiments of FIG. 8, in domain A, the V-u-CM/V-u-SGW is instantiated at a network node near the radio head 820. In domain B, the V-u-CM/V-u-SGW may be instantiated within the domain cloud 811 B. In the implementation of domain A, the V-u-CM/V-u-SGW may migrate with the UE A 805 as it travels from a first radio head 820 to a second radio head 821 (i.e. the V-u-CM/V-u-SGW may be moved to a network node serving the second radio head 821). In contrast, in the implementation of domain B, the V-u-CM/V-u-SGW may remain instantiated in the domain cloud 811 B as the UE B 807 travels throughout the domain B. In this implementation the connections of the V-u-CM/V-u-SGW may be re-directed from the first radio head 822 of a first TA of domain B to a second radio head (not shown in FIG. 8) of a second TA of domain B.

Figure 9:
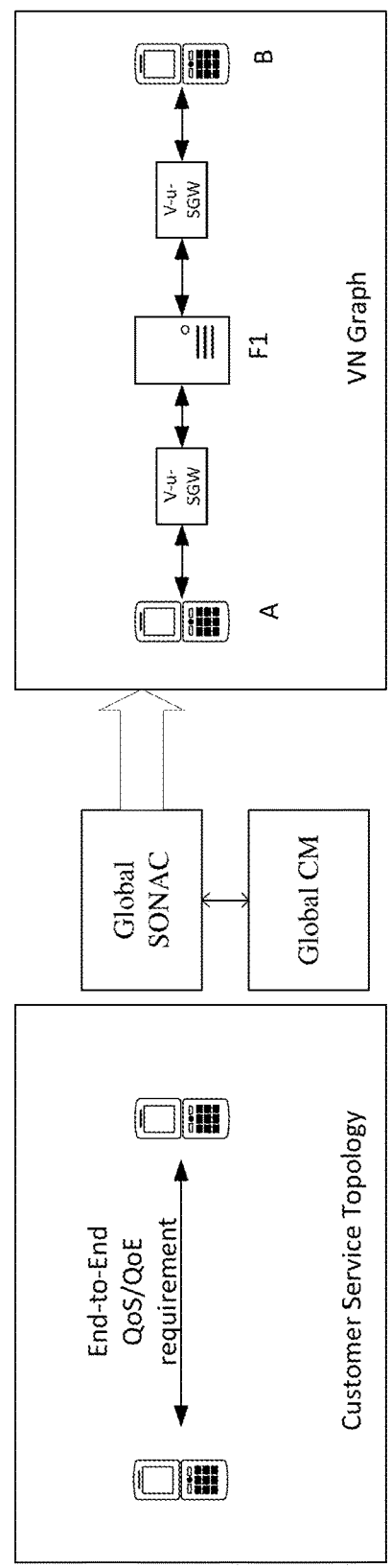
FIG. 9 illustrates a connection between end customer A and end customer B in terms of a service level graph (on the left) and virtual network (VN) graph on the right.

FIG. 9 illustrates a connection between end customer A and end customer B in terms of a service level graph (on the left) and virtual network (VN) graph on the right.

The service level graph illustrates particular requirements such as Quality of Service (QoS) or Quality of Experience (QoE) requirements which may be specified for the connection. The virtual network (VN) graph can include including a description of a forwarding graph and a description of the links between nodes of the forwarding graph. The forwarding graph may include a description of the specified function components as graph nodes, and their interconnection as graph links. In an exemplar embodiment, and as illustrated, the VN graph specifies a virtual user-specific serving gateway servicing a first user (v-u-SGW (UE-A)), operatively coupled to a first function component F1, which is in turn operatively coupled to a virtual user-specific serving gateway servicing a second user (v-u-SGW (UE-B)). Other functions may be provided by the network operator as necessary, according to the customer's service requirements/profile.

An example of a connection with a QoE guarantee (for example a voice call in which a circuit is emulated) is now discussed according to an embodiment. For an embodiment which utilizes SONAC or other software controlled call processing functionality, end-to-end SDRA is activated to assign physical resources for the duration of the connection. An exemplar procedure for such a connection is as follows:

As an initial step, in response to network querying UE-B sends a service request with description to UE-B's v-s-SGW to establish its location UE-A seeks to connect with UE-B and sends a request to UE-A's v-s-SGW UE-A's v-s-SGW sends the request to a SONAC, e.g., domain SONAC The domain SONAC asks for the location of UE-B from domain A's CM Domain A CM searches for UE-B's location locally first and then may contact the global CM if necessary to determine the location of UE-B Domain A CM informs domain A SONAC of the location of UE-B based upon its queries If UE-B is located in another domain, domain A SONAC informs the global SONAC (as a connection between two networks/domains is required)

Global SDT determines the logical topology at the network level to connect UE-A to UE-B The domain SDT determines intra-domain SDT In a final step the VN/slice/connection may be configured.

Figure 10:
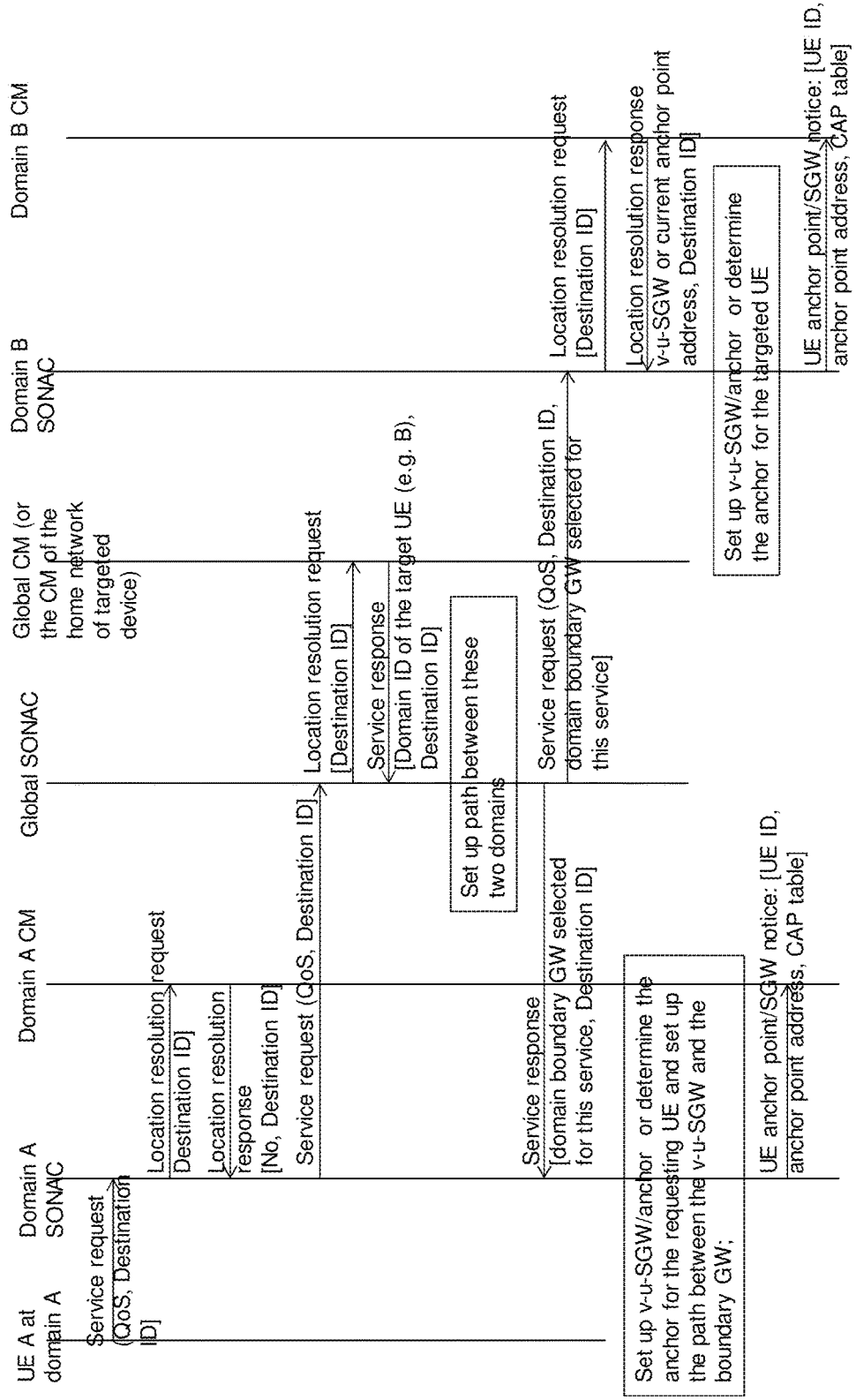
FIG. 10 illustrates a signaling diagram for an embodiment of making a connection between UE.

Referring to FIG. 10, a signaling diagram presents an exemplary signaling procedure for making a connection between UE:

UE-A in domain A sends a service request to the domain A SONAC to make a connection with UE-B The service request may include QoS and a Destination ID corresponding to UE-B The domain A SONAC forwards a resolution request including the Destination ID to the domain A CM The domain A CM evaluates the resolution request to determine whether the Destination ID (i.e. UE-B) is within domain A and returns a location resolution response to the domain A SONAC For the case where UE-B is not identified as residing within domain A, the domain A SONAC then forwards a service request to the Global SONAC, that requests a connection be made with a UE outside of domain A The service request may include QoS and a Destination ID corresponding to UE-B The Global SONAC may forward a location resolution request including the Destination ID to a CM having jurisdiction over UE-B For instance, the Global SONAC may forward the location resolution request to a global CM, or may forward the location resolution request directly to a domain B CM if known In a general case the Global SONAC will forward the location resolution request to the Global CM The Global CM will locate the domain of the target UE (i.e. UE-B residing in domain B), and return a service response to the Global SONAC including the domain ID of the target UE and the Destination ID The Global SONAC receives the service response and sets up a path between the requesting UE domain (i.e. domain A) and the target UE domain (i.e. domain B)

The Global SONAC forwards a service response to the domain A SONAC and forwards a service request to the domain B SONAC The service response may include the domain boundary GW selected for the connection service, along with the Destination ID The service request may include the Destination ID, and the domain boundary GW selected for the connection service; in some implementations the service request may further include a QoS level The domain A SONAC establishes the v-u-SGW/anchor, or determines the current anchor as the case may be, for the requesting UE; the domain A SONAC then sets up the path between the v-u-SGW and the boundary GW identified in the service response The domain A SONAC forwards a UE anchor point/SGW notice to the domain A CM The notice may include the UE-A ID, the anchor point address, and a CAP table The domain B SONAC receives the service request and forwards a location resolution request including the Destination ID of UE-B to the domain B CM The domain B CM returns a location resolution response to the domain B SONAC The location resolution response may include the v-u-SGW or current anchor point address for UE-B, and the Destination ID The domain B SONAC receives the location resolution response and establishes the v-u-SGW/anchor, or determines the current anchor as the case may be, The domain B SONAC forwards a UE anchor point/SGW notice to the domain B CM The notice may include the UE-B ID, anchor point address, and a CAP table An example of a connection without a QoE guarantee (for example a best effort routing data packets) is now discussed according to an embodiment. For an embodiment which utilizes SONAC or other software controlled call processing functionality, no end-to-end SDRA is activated. In other words, no physical resources are assigned for the duration of the connection, and packets are routed similar to IP packet routing. An example procedure for UE-A transmitting one or more packets to UE-B is as follows:

UE-A inserts—UE B's global user ID (or device ID—which is known by UE-A or can be determined via a device ID resolution server) into the message;

UE-A inserts UE-B's ID or local service ID into the message and sends the message to NN1 or a NN hosting the v-u-SGW or equivalent.

The NN1 checks the packet. If it can insert any missing routing information (e.g., destination, SID, source routing, etc.), the revised message is sent to the v-u-SGW or equivalent for forwarding to B. However, if there is still missing routing information, then each level of the hierarchy is queried until the missing information is determined as follows:

1. The NN1 sends the packet to the domain SONAC;
2. The Domain SONAC queries Domain CM for location (and addressing) information for UE-B
3. If the domain SONAC cannot forward the packet (because UE-B is not within Domain A and therefore the Domain CM cannot provide the location information), then the domain SONAC sends the request to the next layer in the hierarchy (which in this example is the global SONAC). In this case, the Global SONAC queries the Global CM for location (and addressing) information for UE-B, and sends this information to the Domain SONAC;
4. the Domain SONAC establishes a logical connection between v-s-SGW and a network GW capable of forwarding the packet to its destination; and then the message is sent to the v-u-SGW or equivalent for forwarding to UE-B.

Or, as an alternative the v-s-SGW asks for the location of UE-B from CM;

the CM returns the location of UE-B back to the requesting v-s-SGW (which may involve multiple requests and responses up and down the hierarchy of CMs); and the v-s-SGW inserts the forwarding header (source routing).

Figure 11:
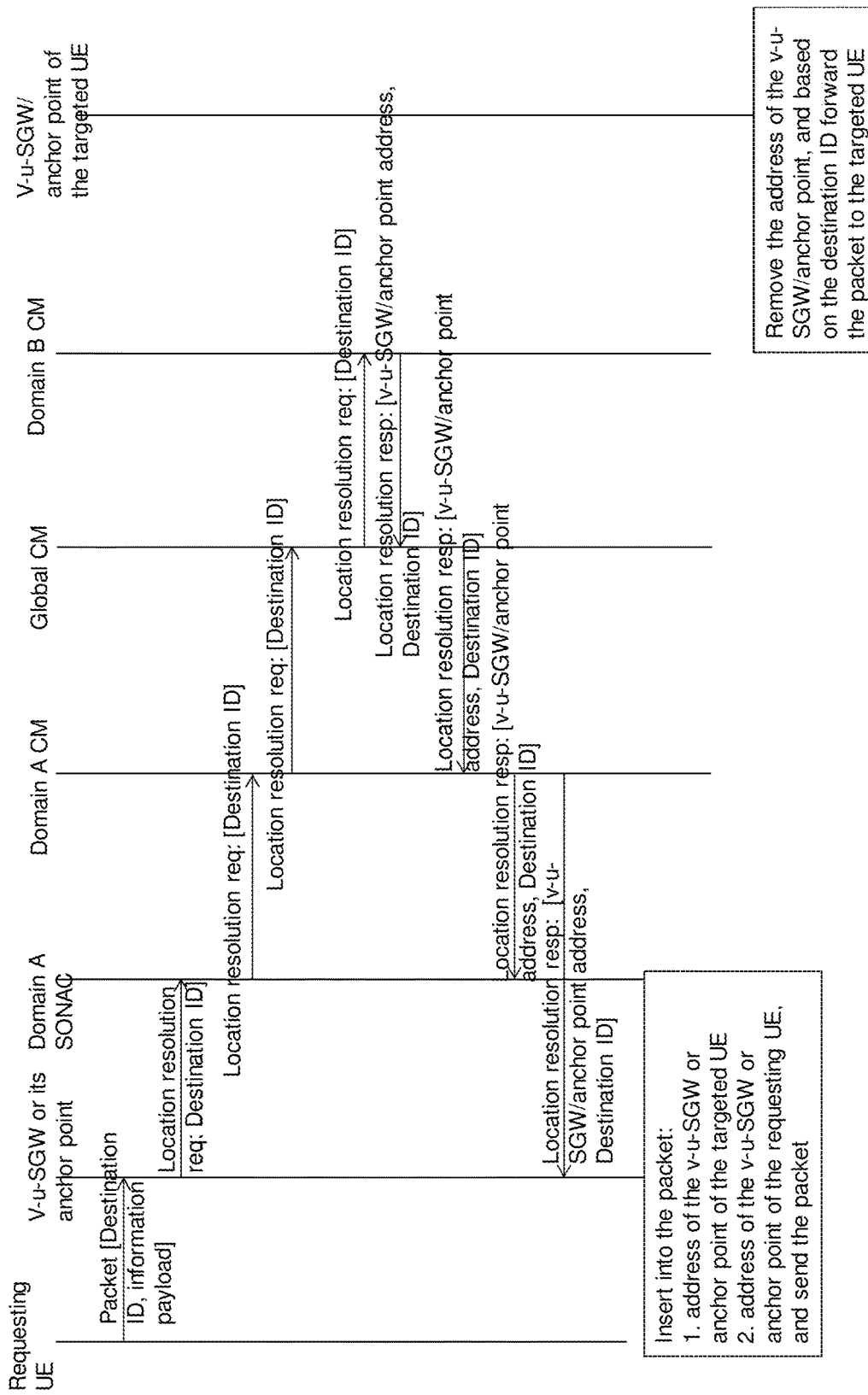
FIG. 11 illustrates a signaling diagram for an embodiment of making a connection between UE located within different domains.

Referring to FIG. 11, a signaling diagram presents an exemplary signaling procedure for making a connection between UE located within different domains:

The requesting UE forwards a packet intended for a target UE (i.e. UE B), the packet including a Destination ID and an information payload, to the v-u-SGW/anchor point The v-u-SGW/anchor point forwards a location resolution request based on the Destination ID to the domain A SONAC The domain A SONAC forwards a location resolution request to the domain A CM The domain A CM establishes that the target UE (UE B) is not within domain A Either the domain A CM or the domain A SONAC may forward a location resolution request to the Global CM The Global CM forwards the location resolution request to the domain B CM The domain B CM returns a location resolution response including the v-u-SGW/anchor point and Destination ID of UE-B The location resolution response is passed back to the Global CM, the domain A CM, and finally the domain A SONAC Either the domain A SONAC or the domain A CM may forward the location resolution response to the v-u-SGW of UE-A The v-u-SGW/anchor point of UE-A may insert into the packet the v-u-SGW/anchor point of the target UE and the v-u-SGW/anchor point of the requesting UE; The v-u-SGW of UE-A may forward the modified packet to the v-u-SGW of UE-B The v-u-SGW receives the modified packet, removes the address of the v-u-SGW/anchor point of UE-B and, based on the Destination ID, forwards the modified packet to the target UE (UE-B)

A third example of location resolution is now discussed for a response packet in response to a requesting packet. In this example, it is assumed there is a small interval between request and response (otherwise it will be treated as a new connection). In this case, there are two scenarios:

1 Same location resolution scheme as for requesting packet. If the UE moves before the response packet arrives, the SGW still buffers the packet and the SDRA-TE provides updated forwarding rules to the SGW to identify to which AP to forward the packet.

2 Or Symmetric path (location information swap between source and destination)

However, the sender's location may have changed by the time the response packet comes to v-u-SGW. In this case, the procedure differs depending on whether SDRA is used.

A) if SDRA is used:
the SDRA which controls the resource allocation from v-u-SGW to the target UE checks the current location of the target UE for the received packet.

B) if no SDRA is used:
the v-s-SGW checks the location of the target UE via v-u-CM and inserts a new destination address.

Scheme 2

Figure 12:
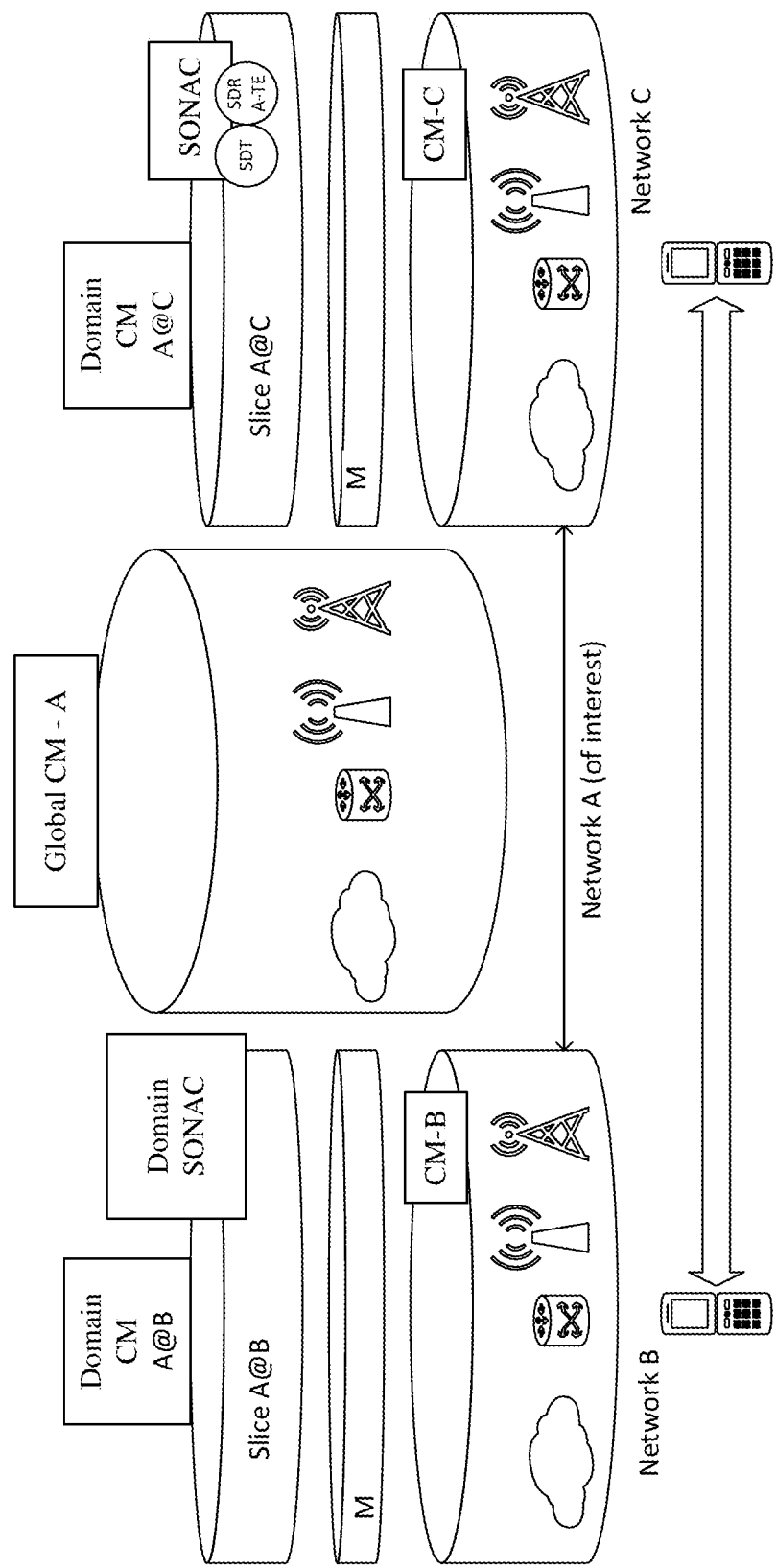
FIG. 12 illustrates a network configuration which allows VN to be established to simulate a single global network according to an embodiment.

Referring to FIG. 12, a network diagram illustrating a network configuration which allows a Virtual Network (slices) to be established to simulate a single global network according to an embodiment is shown. For example, Operator A owns physical networks in a certain geographic area. Operator A sets up VNs on top of other WNOs (Networks B and C). The integrated virtual networks enable operator A to provide global coverage to a UE. In such an embodiment, each network includes wireless network infrastructure, including NNs, wireless links (spectrum), etc. These physical resources can be utilized by a UE regardless of which network the UE is subscribed to.

Network slicing refers to a technique for separating different types of network traffic which can be used in reconfigurable network architectures, such as networks employing Network Function Virtualization (NFV). In contrast with having wireless UEs connect with the network through a Mobility Management Entity (MME) determined by a network infrastructure component (e.g. base station, access point, eNB) that was selected by that UE, network slicing may allow the network to instantiate separate network slices directed toward different network services in order to separate different types of traffic, the different types of traffic potentially having different packet processing requirements and QoS requirements. Network slicing may correspond to the allocation of pooled resources to offer different services to different customers or groups of customers, such that different services are supported by different customized virtual networks, where the different customized virtual networks are substantially separate from one another from the customer's point of view. The pooled resources may be commercial-off-the-shelf hardware components capable of configuration through virtualization approaches, such as NFV, in order to support various network functionalities for supporting the operations of the network slices.

In such an embodiment, the physical network provider (e.g., Network B, C) performs mobile's location tracking and interacts with virtual network operator. For example, slice A@B is the resource provided by network B to support slice A at the physical location serviced by network B. Similarly, slice A@C is the resource provided by network C to support slice A at the physical location serviced by network C.

Figure 13:
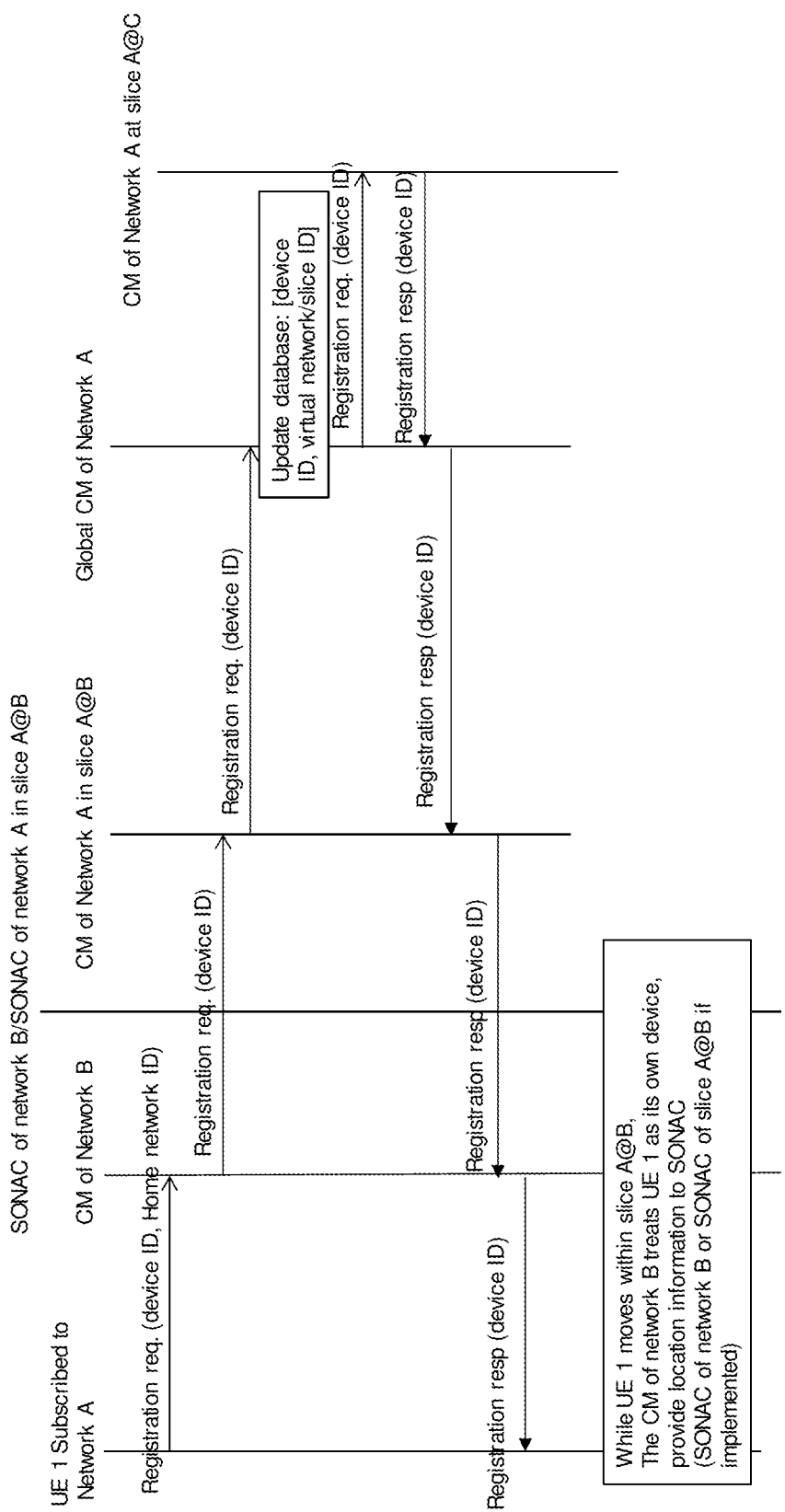
FIG. 13 illustrates a signaling diagram for an embodiment of location tracking.

Referring to FIG. 13, a signaling diagram presents an embodiment of a location tracking procedure according for a UE 1 which moves into network B UE 1 performs location registration at CM-B by forwarding a location registration request to CM-B;

CM-B forwards the location registration request to Domain CM-A@B of slice A@B;

Domain CM-A@B forwards the location registration request to the Global CM-A;

UE 1's location is updated in the global CM-A and domain CM-A@B and may further be communicated to domain CM A@C by forwarding a location registration request to CM A@C;

A registration response including the device ID, may be returned to each of the communicators: Global CM-A, CM A@B, CM-B, and UE 1, to confirm the location registration of UE 1 in network B on slice A@B;

CM-B attaches UE1 to Slice A@B, CM-B treats UE 1 as a locally registered device to provide location information to the SONAC (SONAC of operator B, SONAC of slice A@B, and/or the global SONAC)

While UE 1 moves within slice A@B

If UE 2 (registered UE of operator A) moves into Network C, a similar procedure is followed.

An example of a location resolution procedure according to an embodiment, using the example of UE 1 calling UE 2 includes: UE 1 sending a request to domain CM A@B (which needs to resolve where UE 2 is located in order to complete the call). Domain CM A@B contacts global CM-A, which had previously received UE 2's current location from serving network (Slice A@C).

The connection between UE1 and UE 2 is set up as: UE1—Slice A@B—Slice A—Slice A@C—UE 2

This end-to-end connection is via virtual slice/service specific GWs at Slice A@B and slice A@C, and virtual and physical boarder GWs at Slice A, Slice A@B and slice A@C Embodiments for data forwarding are now discussed. If a UE belongs to a pre-configured network slice (e.g., for an SDRA-enabled connection with configured links), then only the slice ID is required for routing. Accordingly, the sending UE only needs to insert the service slice ID into the packet and then the CM will provide end-to-end routing for the data directly to destination.

If the UE does not belong to a network slice, then the sending UE can do one of two things. One option is for the sending UE to insert a destination UE/user name into the packet, and then the CM will provide the end-to-end routing information based on the destination UE/user name (using a routing protocol similar to how packets with an IP address can be routed by IP-enabled routers). A second option includes the sending UE obtaining the location information of the recipient UE from a CM location resolution function, and then inserts this location information into the packet.

Other aspects of note which can be useful in implementing embodiments include the following. Some embodiments include using Global UE name/credential, for example as discussed in U.S. Ser. No. 61/948,507, 5G Radio Access Network Architecture (Software Defined RAN) filed Mar. 5, 2014, which is hereby incorporated by reference in its entirety. Some embodiments utilize $3^{rd}$ party Authorization, Authentication and Accounting (AAA) and/or $3^{rd}$ party location management. Some embodiments utilize Cross networks (2G/3G/4G/RAT) AAA as discussed in U.S. Ser. No. 62/020,593 filed Jul. 3, 2014, which is hereby incorporated by reference in its entirety. Some embodiments utilize Cross networks (2G/3G/4G/RAT) location tracking/resolution which can include using Global e-yellow-book and/or Location Tracking as a Service as discussed in U.S. Ser. No. 61/948,507 filed Mar. 5, 2014, which is hereby incorporated by reference in its entirety. Some embodiments utilize Unified data/voice location tracking/resolution which can use the same scheme for both data and Voice (end-to-end SONAC). In this case SONAC replace IMS for QoE services. Some embodiments utilize Optimized forwarding (data plane protocol and SONAC). Some embodiments utilize Cross network charging using a $3^{rd}$ party, for example as discussed in: U.S. Ser. No. 62/169,084 filed Jun. 1, 2015, which is hereby incorporated by reference in its entirety.

Further some embodiments can utilize the following:

Interworking among physical network operators, which can include

Inter-operator handover, including the current serving network informing the candidate network; and Transparent v-s-SGW migration across networks (which may be based on inter-operator agreements)

Interworking between virtual network operators (VNOs) and physical network operators (WNO)—which can include one or more of:

VN initiation;

VN update; and

Intra-VN slicing management.

Further, in some embodiments, the Physical or Virtual CM layers may provide location information to customers. This can be useful for network management, and depending on the jurisdiction, emergency services and/or law enforcement.

A UE may include any UE configured for communications with access nodes of the communications system. For example, UE may comprise a cellular phone, a smart phone, a tablet, a wireless transmit/receive unit, a laptop, a personal digital assistant (PDA), a consumer electronics UE, a data collection/transmission unit, a gaming unit, a set top box, or other network-connected computing device. In certain embodiments, UE may comprise a network node such as a switch, router, hub or access point.

Interfaces which communicatively couple UEs to NNs may comprise any suitable wireless communications interface, including radio frequency (RF), microwave, infrared (IR), or the like. Communications system may employ any suitable radio access technology (RAT) or channel access scheme for communication between UE and NNs such as CDMA, TDMA, FDMA, OFDMA, SC-FDMA, wideband CDMA (WCDMA), high-speed packet access (HSPA), evolved HSPA (HSPA+), high-speed downlink packet access (HSDPA), high-speed uplink packet access (HSUPA), long term evolution (LTE), LTE advanced (LTE-A), universal mobile telecommunications system (UMTS), terrestrial radio access (UTRA), evolved UMTS terrestrial radio access (E-UTRA), IEE 802.16 (i.e worldwide interoperability for microwave access (WiMAX)), CDMA2000, CDMA2000 IX, CDMA2000 EV-DO, interim standard 2000 (IS-2000), interim standard 95 (IS-95), interim standard 856 (IS-856), global system for mobile communications (GSM), enhanced data rates for GSM evolution (EDGE), GSM EDGE (GERAN), and the like.

Figure 14:
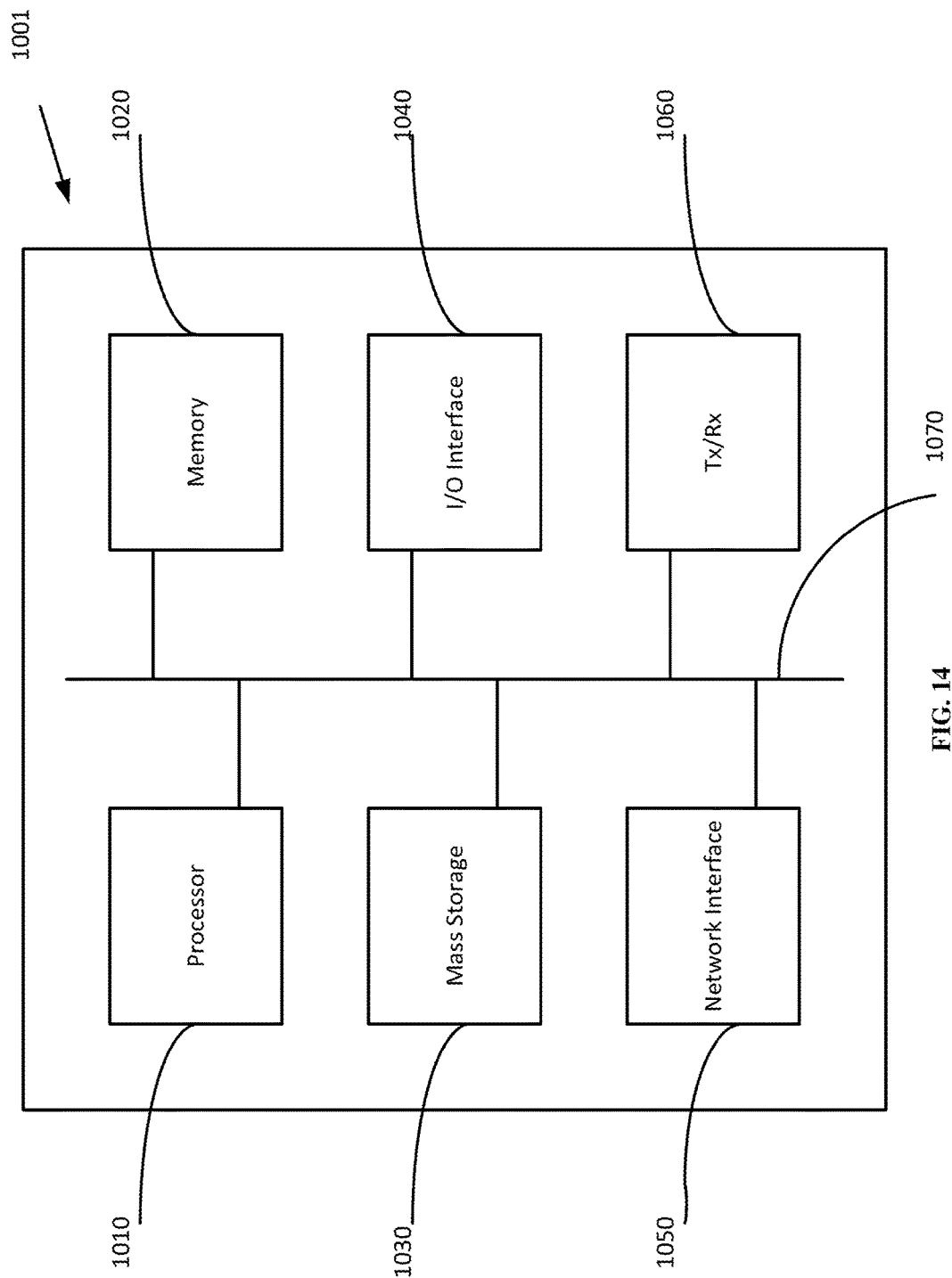
FIG. 14 illustrates a processing system that may be used for deployment or instantiating components of the wireless communication network.

FIG. 14 is an exemplary block diagram of a processing system 1001 that may be used for deployment or instantiating components of the wireless communication network, such as the CM, SONAC, and SGW. As shown in FIG. 14, processing system 1001 includes a processor 1010 (which may comprise one or more processing units), memory 1020, non-transitory mass storage 1030, network interface 1050, I/O interface 1040, and transceiver 1060, all of which are communicatively coupled via bi-directional bus 1070. The processing system 1001 further includes input terminals, and output terminals, for receiving inputs and outputs, respectively, from other network components (not shown). The processing system 1001 may typically be enabled by program code executed on one or more processing units of the processing system 1001.

Figure 15:
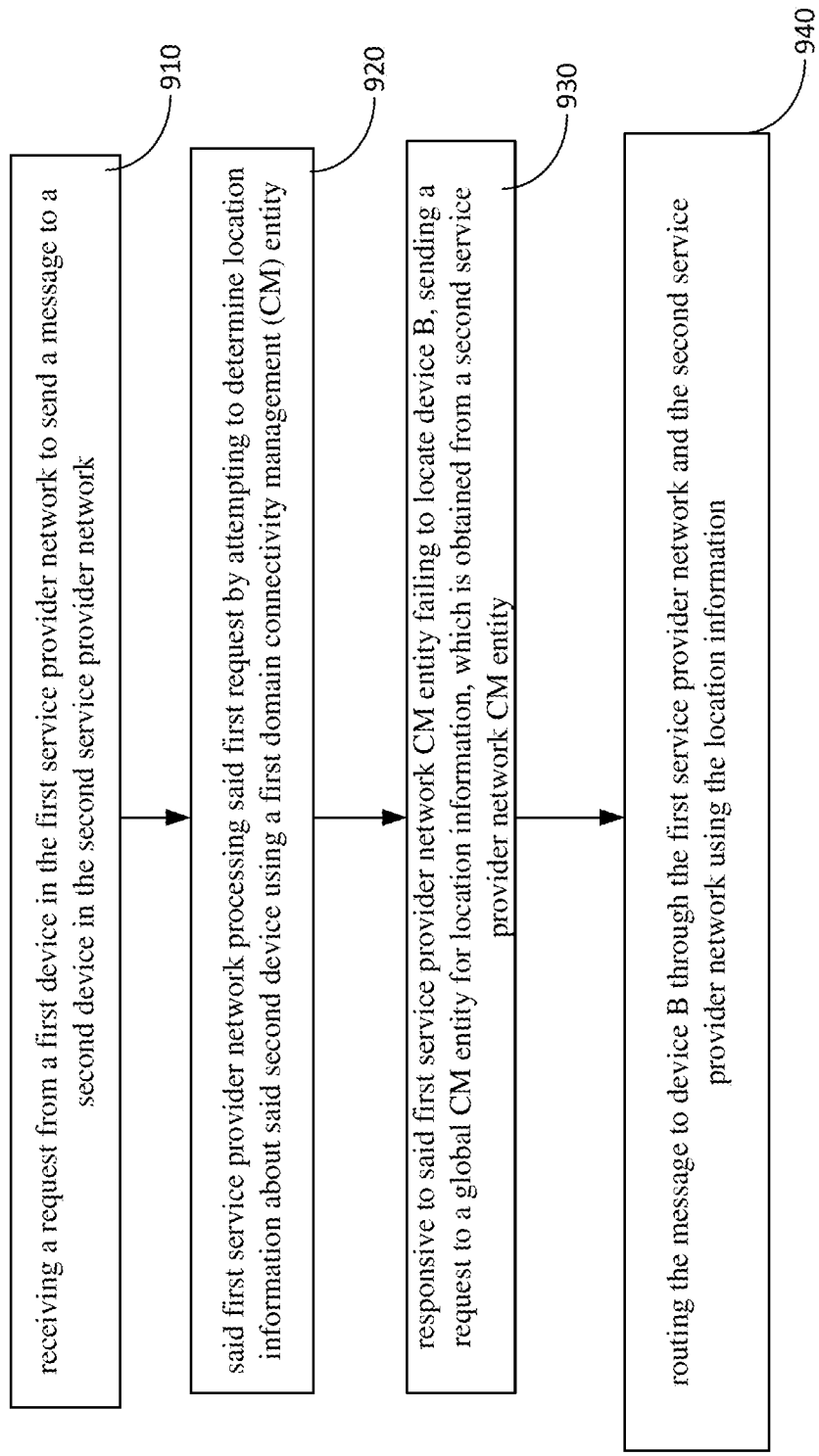
FIG. 15 is a flowchart illustrating a method of interoperability according to an embodiment.

FIG. 15 is a flowchart illustrating a method of interoperability, according to an embodiment, between a first service provider network and a second service provider network.

Such a method includes receiving a request from a first UE in a first service provider network to send a message to a second UE in a second service provider network 910. The method includes the first service provider network processing the request by attempting to determine location information about the second UE using a first service provider network connectivity management (CM) entity 920. Responsive to first service provider network CM entity failing to locate the second UE, the first service provider network CM entity sends a request to up the hierarchy of CM layers to a global CM entity for location information 930 relating to the second UE. The location information is obtained from a second service provider network CM entity in the second service provider network operated by the second service provider network. In some embodiments, this location information can be received in real time, or near real-time. In some embodiments, the global CM entity already has the location information as the second service provider network provides continual updates comprising updated location information to the global CM entity as part of its ongoing location tracking procedure. Once received, the first service provider network can then route the message to the second device through the first service provider network and the second service provider network using the received location information 940.

Through the descriptions of the preceding embodiments, the present invention may be implemented by using hardware only or by using software and a necessary universal hardware platform. Based on such understandings, the technical solution of the present invention may be embodied in the form of a software product. The software product may be stored in a non-volatile or non-transitory storage medium, which can be a compact disk read-only memory (CD-ROM), USB flash disk, or a removable hard disk. The software product includes a number of instructions that enable a computing device (personal computer, server, network device, or UE) to execute the methods provided in the embodiments of the present invention. For example, such an execution may correspond to a simulation of the logical operations as described herein. The software product may additionally or alternatively include number of instructions that enable a computing device to execute operations for configuring or programming a digital logic apparatus in accordance with embodiments of the present invention.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

I claim:

1. A method for location tracking of a user equipment (UE), comprising:

obtaining, by a domain connectivity management (CM) component, location information of the UE;

allocating, by the domain CM component, a first virtualized connectivity management (CM) component for connecting the UE based on the location information.

2. The method of claim 1, further comprising:

if the location information indicates the UE is moving from a first Tracking Area (TA) to a second TA in a first coverage of an anchor point (CAP); and, migrating, by the domain CM component, the first virtualized CM component to the second TA.

3. The method of claim 2, further comprising updating, by the domain CM component, a CM database with the second TA.

4. The method of claim 2, wherein the first virtualized CM component was instantiated at a first radio head serving the UE in the first TA, and wherein the first virtualized CM component is migrated by moving the first virtualized CM component to a second radio head serving the second TA.

5. The method of claim 2, wherein the first virtualized CM component was instantiated in a domain cloud serving the first TA and the second TA, and wherein the migrating the first virtualized CM component to the second TA comprises re-directing its connections to the UE from the first TA to the second TA.

6. The method of claim 1, further comprising:
if the location information indicates the UE is moving from a first TA of a first CAP to a second TA of a second CAP:
allocating, by the domain CM component, a second virtualized CM component for connecting the UE in the second TA of the second CAP.

7. The method of claim 6, further comprising updating, by the domain CM component, a CM database with the second TA of the second CAP.

8. The method of claim 1, further comprising:
if the location information indicates the UE moving from a CAP of a first network to a second CAP of a second network,
sending, by the domain CM component, the location information to a global CM component; and,
in response to the global CM component receiving the updated location information:
sending, by a global service-oriented virtual network auto-creation (SONAC) in communication with the global CM component, a service request to a second network SONAC to manage the connecting between a second virtualized CM component in the second network and the UE.

9. The method of claim 1, wherein after the first virtualized CM component has been allocated, the method further comprises forwarding to at least one access network node an uplink measurement monitor request including at least one uplink sequence to be monitored.

10. A method of interoperability for location tracking of User Equipment (UE) between a first service provider network and a second service provider network comprising:
a first domain CM component serving a first domain of the first service provider network receiving, from a first UE in the first domain a request to send a message to a second UE;
said first domain CM component processing said request by attempting to determine location information about said second UE from CM components within said first domain;
responsive to failing to locate the second UE, said first domain CM component sending, to a global CM entity, a request for location information;
said first domain CM component receiving from said global entity said location information identifying said second UE within another domain of a one of said plurality of service provider networks; and,
said first domain CM component forwarding the message to the second UE through the first service provider network and the second service provider network using the location information.

11. The method of claim 10, wherein the location information is provided by the global CM entity from an information location datastore maintained by the global CM entity and updated by regular updates received from domain CM components corresponding to each of the plurality of service provider networks.

12. The method of claim 10, wherein said request for location information includes Quality of Service (QoS) and a destination ID corresponding to the second UE.

13. The method of claim 10, wherein said received location information comprises a domain boundary GW selected for a connection service to the second UE, and a Destination ID.

14. A method of tracking a location of a UE across a plurality of communication networks comprising:
a global CM receiving a location report related to the UE from a domain CM, the global CM in communication with the plurality of communication networks;
the global CM maintaining the location reports in a datastore; and,
when the global CM receives a location resolution request corresponding to the UE from a requesting domain CM, the global CM returns a service response including the domain ID of the UE and the destination ID of the UE to the requesting domain CM.

15. The method of claim 14, wherein the location information indicates the UE moving from a CAP of a first network to a second CAP of a second network the method further comprises:
receiving, by the global CM, location information from the domain CM; and,
communicating, by the global CM, with a global service-oriented virtual network auto-creation (SONAC) to request a second network to connect the UE.

16. A domain connectivity management (CM) component configured to track a location of a user equipment (UE), the CM component comprising a network interface, a microprocessor, and a memory component and configured to:
obtain location information of the UE; and,
allocate a first virtualized connectivity management (CM) component for connecting the UE based on the location information.

17. The CM component of claim 16, further configured to migrate the first virtualized CM component to a second TA if the location information indicates the UE is moving from a first TA to the second TA in a first coverage of an anchor point (CAP).

18. The CM component of claim 16, further configured to allocate a second virtualized CM component for connecting the UE in a second TA of a second CAP if the location information indicates the UE is moving from a first TA of a first CAP to the second TA of the second CAP.

19. The CM component of claim 16, further configured to send the location information to a global CM component if the location information indicates the UE moving from a CAP of a first network to a second CAP of a second network.

20. A computing device comprising at least one processing unit operative as a domain CM component to:
receive from a first UE in a first domain a request to send a message to a second UE;
process said request by attempting to determine location information about said second UE from CM components within said first domain;
responsive to failing to locate the second UE, to send, to a global CM entity, a request for location information;
receive from said global entity said location information identifying said second UE within another domain of a one of a plurality of service provider networks; and, forward the message to the second UE through the plurality of service provider networks using the location information.

* * * * *